United States Patent
Kantojarvi

(10) Patent No.: US 12,251,766 B2
(45) Date of Patent: Mar. 18, 2025

(54) CUTTING INSERT AND MILLING TOOL

(71) Applicant: SECO TOOLS AB, Fagersta (SE)

(72) Inventor: Fredrik Kantojarvi, Fagersta (SE)

(73) Assignee: Seco Tools AB, Fagersta (SE)

(*) Notice: Subject to any disclaimer, the term of this patent is extended or adjusted under 35 U.S.C. 154(b) by 72 days.

(21) Appl. No.: 17/768,650

(22) PCT Filed: Oct. 1, 2020

(86) PCT No.: PCT/EP2020/077502
§ 371 (c)(1),
(2) Date: Apr. 13, 2022

(87) PCT Pub. No.: WO2021/073885
PCT Pub. Date: Apr. 22, 2021

(65) Prior Publication Data
US 2024/0109138 A1    Apr. 4, 2024

(30) Foreign Application Priority Data
Oct. 14, 2019  (EP) ...................................... 19203068

(51) Int. Cl.
*B23C 5/20* (2006.01)
*B23C 5/06* (2006.01)
*B23C 5/22* (2006.01)

(52) U.S. Cl.
CPC .............. *B23C 5/2213* (2013.01); *B23C 5/06* (2013.01); *B23C 2200/0494* (2013.01); *B23C 2200/12* (2013.01); *B23C 2200/208* (2013.01)

(58) Field of Classification Search
CPC . B23C 5/2213; B23C 5/06; B23C 2200/0411; B23C 2200/085;
(Continued)

(56) References Cited

U.S. PATENT DOCUMENTS

| | | | | |
|---|---|---|---|---|
| 5,207,538 A | * | 5/1993 | Satran | .................... B23C 5/2213 D15/139 |
| 5,454,670 A | * | 10/1995 | Noda | ...................... B23C 5/202 407/42 |

(Continued)

FOREIGN PATENT DOCUMENTS

| | | |
|---|---|---|
| EP | 2764940 A1 | 8/2014 |
| EP | 2774706 A1 | 9/2014 |

(Continued)

*Primary Examiner* — Sara Addisu
(74) *Attorney, Agent, or Firm* — Corinne R. Gorski

(57) ABSTRACT

A cutting insert includes a first and a second pair of opposing side surfaces. As seen towards a first side surface, a first axial relief face and a first axial abutment face form part of a first surface grouping on a first side of a longitudinal plane. As seen towards a second side surface, a second axial relief face and a second axial abutment face form part of a second surface grouping on the first side of the longitudinal plane. The first axial abutment face forms a substantially flat surface and extends perpendicularly to a median plane of the insert. The second axial abutment face forms a substantially flat surface and extends perpendicularly to the median plane. A second side surface of the first pair of opposing side surfaces has a first and a second radial abutment face.

22 Claims, 10 Drawing Sheets

(58) Field of Classification Search
CPC .......... B23C 2200/284; B23C 2210/04; B23C 2200/125; B23C 2200/28; B23C 2210/168; B23C 5/00; B23C 2200/0494; B23C 2200/208; B23C 5/2208; B23C 2200/12

See application file for complete search history.

(56) References Cited

U.S. PATENT DOCUMENTS

| | | | | |
|---|---|---|---|---|
| 5,593,255 | A * | 1/1997 | Satran | B23C 5/109 407/116 |
| 6,196,770 | B1 * | 3/2001 | Astrom | B23C 5/109 407/43 |
| 7,070,363 | B2 * | 7/2006 | Long, II | B23C 5/109 407/115 |
| 7,261,497 | B2 * | 8/2007 | Maeda | B23C 5/109 407/42 |
| 2008/0166191 | A1 * | 7/2008 | Andersson | B23C 5/2208 407/103 |
| 2008/0273931 | A1 * | 11/2008 | Spitzenberger | B23C 5/202 407/51 |
| 2009/0155005 | A1 * | 6/2009 | Jansson | B23C 5/202 407/114 |
| 2012/0039678 | A1 * | 2/2012 | Nguyen | B23C 5/109 407/113 |
| 2013/0108388 | A1 * | 5/2013 | Ishi | B23C 5/109 407/113 |
| 2013/0115022 | A1 * | 5/2013 | Ishi | B23C 5/202 407/100 |
| 2013/0121775 | A1 * | 5/2013 | Dudzinsky | B23C 5/2213 407/42 |
| 2013/0129432 | A1 * | 5/2013 | Jaeger | B23C 5/202 407/42 |
| 2017/0032665 | A1 | 2/2017 | Evans | |

FOREIGN PATENT DOCUMENTS

| | | |
|---|---|---|
| EP | 3000548 B1 | 3/2016 |
| JP | 2013078828 A | 5/2013 |
| JP | 2014083667 A | 5/2014 |
| WO | 2015002312 A1 | 1/2015 |
| WO | WO-2016045946 A1 * | 3/2016 ............... B23C 5/06 |

* cited by examiner

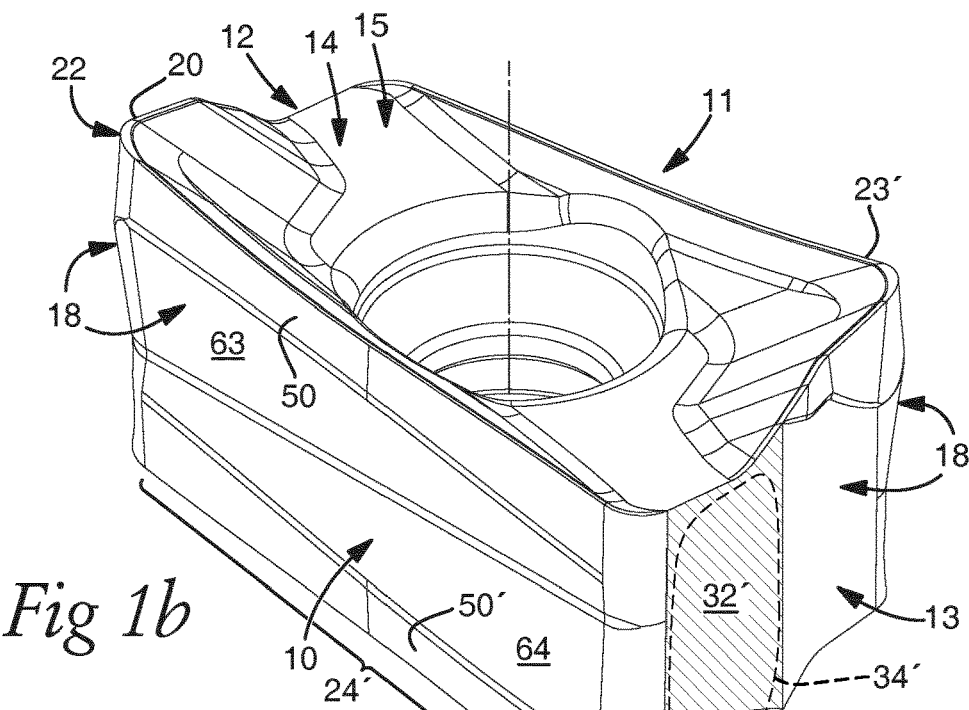
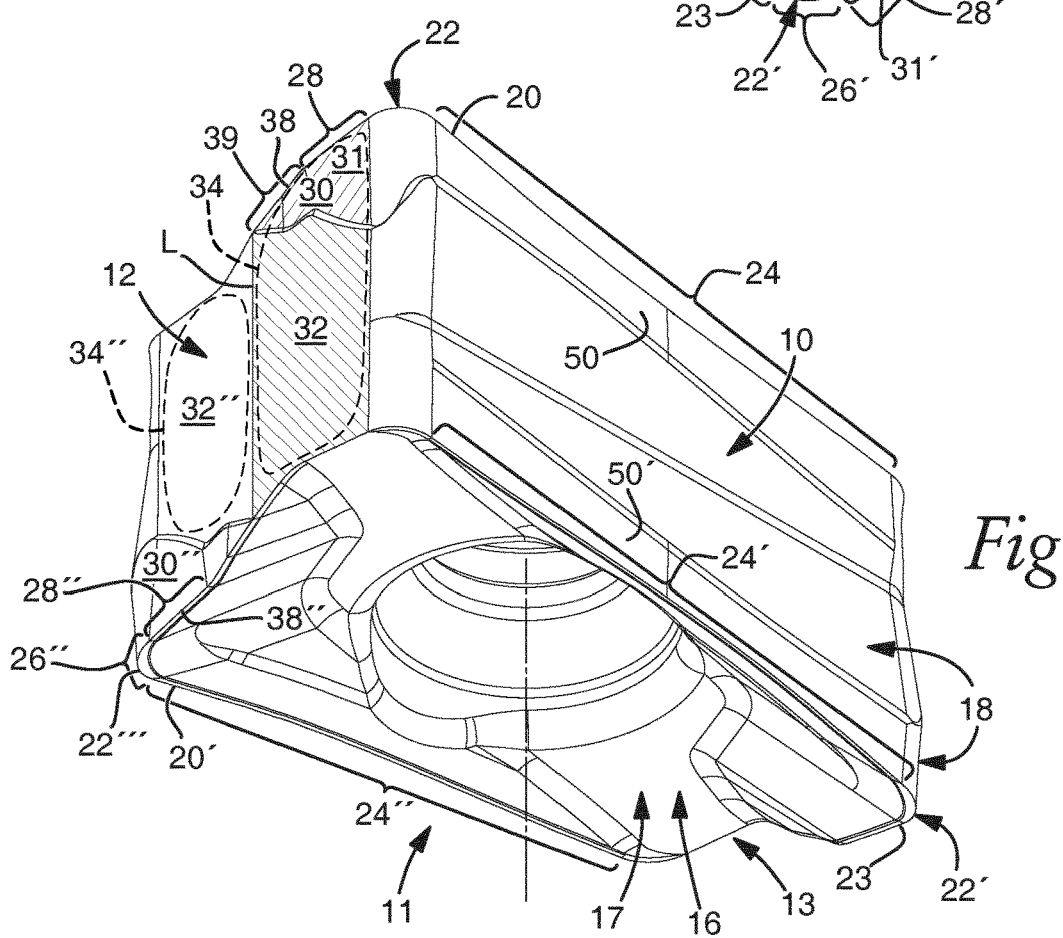

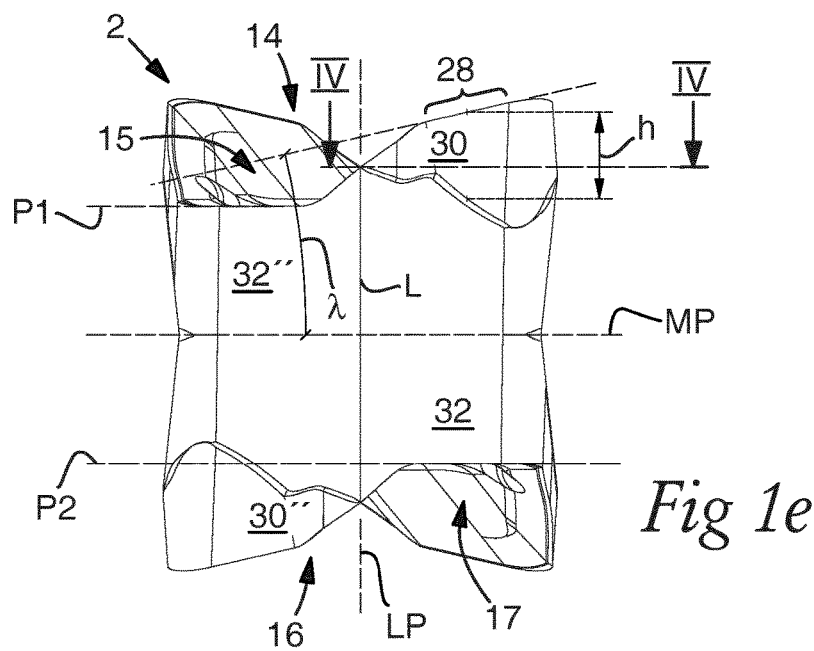
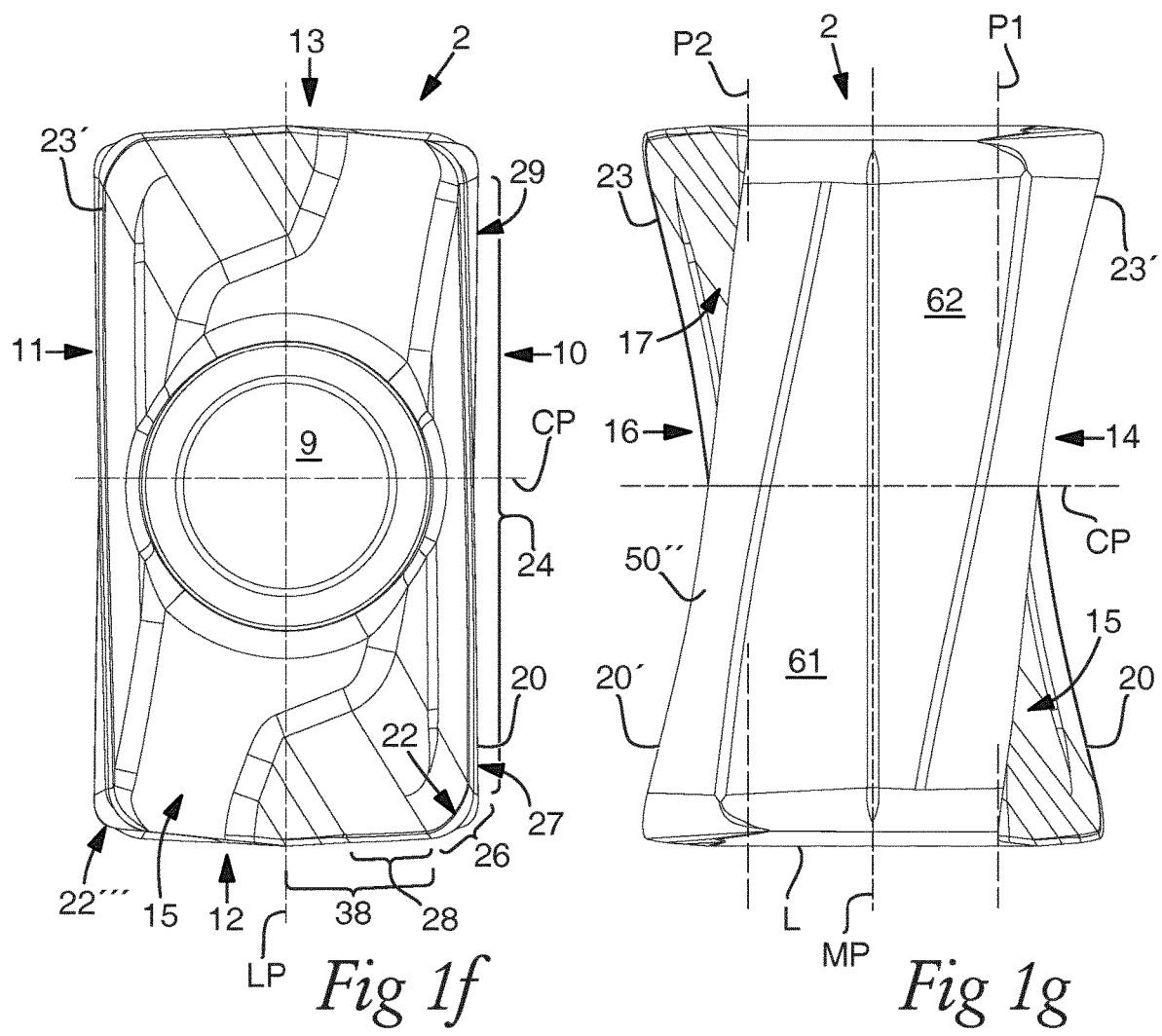
Fig 1e
Fig 1f
Fig 1g

CUTTING INSERT AND MILLING TOOL

RELATED APPLICATION DATA

This application is a § 371 National Stage Application of PCT International Application No. PCT/EP2020/077502 filed Oct. 1, 2020 claiming priority to EP 19203068.2 filed Oct. 14, 2019.

TECHNICAL FIELD

The present disclosure relates to a cutting insert for a milling tool. The present disclosure also relates to a milling tool.

BACKGROUND

A milling tool is a rotating cutting tool, which may be provided with one or more cutting inserts. A square shoulder milling tool is configured for forming a square angle between two surfaces milled in a workpiece in a milling operation with the square shoulder milling tool.

EP 3000548 discloses a double-sided, square shoulder milling cutting insert having a geometry facilitating mounting of the insert on a milling tool such that less energy is required to perform a cutting operation. When the insert is used, the active major cutting edge create a vertical wall in the work-piece and the active minor cutting edge (wiper edge) creates the horizontal surface. For the quality of the machined work-piece, it is important that the active major cutting edge and the active minor cutting edge (wiper edge) have an exact position in the tool body such that the minor cutting edge (wiper edge) lies on a bottom plane PB and that the major cutting edge lies along the surface of a cylinder CYL (FIG. 3). When major cutting edges of the insert are viewed along a central axis of the insert, a first portion of an adjacent clearance surface is disposed outward of the major edge relative to the central axis. Furthermore, the insert is provided with positive clearance surfaces adjacent to the minor cutting edges (wiper edges) as explained in paragraph [0018]. In order to provide necessary radial clearance and in order to prevent interference between the inactive cutting edge below the active cutting edge, the insert seat is arranged with a negative radial tipping-in angle and a negative axial tipping-in angle. The negative radial tipping-in angle is moderate and affects the quality of the machined surface of the work-piece and increases stress on a clamping arrangement of the insert.

A cutting insert needs to be supported in three directions in an insert seat of a milling tool. Using the milling tool as a reference, the cutting insert is supported tangentially, axially, and radially. Such support may be provided e.g. by three dedicated support surfaces in the insert seat, one for each direction. Depending on how the support surfaces are angled in relation to a tangential direction, an axial direction, and a radial direction of the milling tool, and the movement of the milling tool in relation to the workpiece during a milling operation, one or more of the support surfaces may support the cutting insert in more than one of these directions. For instance, a tangential support surface may support the cutting insert not only in the tangential direction, but also in the radial direction. However, for the sake of clearness, the support surfaces in the insert seat of the milling tool may be referred to as a tangential support surface, an axial support surface, and a radial support surface, with reference to their main supporting functions. The cutting insert is provided with abutment faces configured to abut against the support surfaces in the insert seat. The abutment faces may be referred to in a similar manner as the support surfaces, i.e. as a tangential abutment face, an axial abutment face, and a radial abutment face.

The positioning of a cutting insert in an insert seat of a milling tool affects the milling of a relevant work-piece. For instance, manufacturing tolerances and surface finish are influenced by how the cutting insert is positioned in the insert seat. A variation of the axial position of the active main cutting edges in a square shoulder milling tool leads to a deterioration of the quality of the 90° wall in the work-piece. A positioning of the insert seat in the milling tool has an influence on the direction of a total cutting force. An unfavourable direction of the total cutting force relative the support surfaces may lead to small movements of the cutting insert in the insert seat during machining which leads to a deterioration of the quality of the machined surface in the work-piece.

SUMMARY

It would be advantageous to achieve an improved double-sided cutting insert, preferably configured for square shoulder milling, which is better adapted for and more stable when mounted in an insert seat having a negative radial tipping-in angle. It would also be desirable to provide a cutting insert which provides for a more exact positioning in an insert seat of a milling tool. In particular, it would be desirable to provide a cutting insert in which deviation from a target thickness of the cutting insert does not affect axial runout of the cutting insert and the axial position of the main cutting edge, or at least affects axial runout and the axial position of the main cutting edge only to a limited extent, when the cutting insert is mounted in an insert seat of a milling tool. To better address one or more of these concerns, a cutting insert having the features defined in an independent claim is provided.

According to an aspect there is provided a cutting insert for a milling tool, the cutting insert comprising:
  a first side defining a first extension plane,
  a second side opposite to the first side defining a second extension plane, wherein the first and second extension planes extend in parallel, and wherein a centre axis extends perpendicularly through the first and second extension planes,
  a circumferential surface extending between the first side and the second side, the circumferential surface comprising a first pair of opposing side surfaces, and a second pair of opposing side surfaces,
  a median plane extending halfway between the first extension plane and the second extension plane,
  a longitudinal plane extending halfway between the first pair of opposing side surfaces, perpendicularly to the median plane and containing the centre axis,
  a central plane extending perpendicularly to both the median plane and the longitudinal plane and containing the centre axis,
  a first axis extending along an intersection between the median plane and the longitudinal plane and a second axis extending along an intersection between the median plane and the central plane. A first cutting edge extends along an intersection between the first side and the circumferential surface on a first side of the longitudinal plane, the first cutting edge, as seen in a view towards the first side, extending along a corner of the cutting insert. A second cutting edge extends along an intersection between the second side and the circumferential surface on the first side of the longitudinal plane, the second cutting edge, as seen in a view towards the second side, extending along a second corner of the cutting insert. The first cutting edge comprises a first main cutting edge, a first corner cutting edge, and a first auxiliary cutting edge, the first auxiliary cutting edge comprising a first surface-wiping secondary cutting edge, wherein the first main cutting edge adjoins the first corner cutting edge at a first end of the first main cutting edge, and the first corner cutting edge adjoins the first surface-wiping secondary cutting edge. The second cutting edge comprises a second main cutting edge, a second corner cutting edge, and a second auxiliary cutting edge, the second auxiliary cutting edge comprising a second surface-wiping secondary cutting edge, wherein the second main cutting edge adjoins the second corner cutting edge at a first end of the second main cutting edge, and the second corner cutting edge adjoins the second surface-wiping secondary cutting edge. Seen in a view along the first axis towards a first side surface of the second pair of opposing side surfaces, a first axial relief face adjacent to the first auxiliary cutting edge and a first axial abutment face form part of a first surface grouping on the first side of the longitudinal plane, wherein the first surface grouping forms part of the circumferential surface. Seen in a view along the first axis towards a second side surface of the second pair of opposing side surfaces, a second axial relief face adjacent to the second auxiliary cutting edge and a second axial abutment face form part of a second surface grouping on the first side of the longitudinal plane, wherein the second surface grouping forms part of the circumferential surface. The first side surface of the first pair of opposing side surfaces, comprises a first radial relief face arranged adjacent to the first main cutting edge. Seen in a view along the centre axis C, at least part of the first radial relief face extends outside of the first main cutting edge at least along a part of the first main cutting edge. Thanks to this, during manufacturing of the cutting insert, the main cutting edge may be given improved properties by treating only the first radial relief face. Preferably, the first radial relief face has a warrying width measured in a direction from the first main cutting edge perpendicularly towards the median plane. Thanks to this, the main cutting edge may be given a desired geometry and curvature for improved quality of the machined 90° wall in the work-piece. Preferably, the first radial relief face extends more outside the first main cutting edge at a second end of the main cutting edge than at the first end of the main cutting edge. Thanks to this, the insert seat may be given a more advantageous axial tipping-in angle. Preferably, the first radial relief face may be a curved surface or a helically twisted surface. Preferably, the first radial relief face extends more outside the first main cutting edge towards a second end of the main cutting edge than towards the first end of the main cutting edge. The second side surface of the first pair of opposing side surfaces comprises a first radial abutment face and a second radial abutment face, wherein the first radial abutment face is arranged between the second side of the cutting insert and the second radial abutment face, wherein the second radial abutment face is arranged between the first side of the cutting insert and the first radial abutment face. In other words, the first radial abutment face is sandwiched from opposite sides between the second side of the cutting insert and the second radial abutment face. In the same way, the second radial abutment face is sandwiched from opposite sides between the first side of the cutting insert and the first radial abutment face. Seen in a plane parallel with the longitudinal plane, the first axial relief face extends from the first surface-wiping cutting secondary edge at a first obtuse inner angle to the median plane. The first obtuse inner angle is preferably within a range of 91-115 degrees, or within a range of 94-110 degrees, or approximately at 97 degrees to the median plane. Preferably, the insert has 180° rotational symmetry with respect to rotation about the second axis. Seen in a plane parallel with the longitudinal plane the second axial relief face extends from the second surface-wiping cutting secondary edge at a second obtuse inner angle to the median plane. The second obtuse inner angle is preferably within a range of 91-115 degrees, or within a range of 94-110 degrees, or approximately at 97 degrees to the median plane. The first axial abutment face forms a substantially flat surface, wherein the first axial abutment face extends perpendicularly to the median plane. The second axial abutment face forms a substantially flat surface, wherein the second axial abutment face extends perpendicularly to the median plane.

The first radial abutment face forms an obtuse third inner angle to the median plane. The second radial abutment face forms an obtuse fourth inner angle to the median plane. The first radial abutment face and the second radial abutment face are preferably flat surfaces. Thanks to this, manufacturing of the insert and the insert seat is simplified, and better tolerances can be achieved. The obtuse third inner angle between the first radial abutment surface and the median plane is preferably equal to the obtuse fourth inner angle between the second radial abutment surface and the median plane. In this manner, the insert can be given same kind of support both when the first cutting edge is in operable position and when the second cutting edge is in operable position. Preferably, there is a smoothly curved transition between the first and second radial abutment face. A smoothly curved transition is a continuously curved transition without sharp edges. The smoothly curved transition separates the first radial abutment face from the second radial abutment face. In this manner, a stronger insert is achieved. The first and second radial abutment faces are preferably tangentially connected to the smoothly curved transition. Thanks to this, the first and second radial abutment face are simplified which contributes to a simplification of the pressing tool parts that are creating or forming the first and second radial abutment face and the smoothly curved transition, and improves tolerances of the final insert.

Since the first axial abutment face forms a substantially flat surface and the first axial abutment face extends perpendicularly to the median plane, and since the second axial abutment face forms a substantially flat surface and the second axial abutment face extends perpendicularly to the median plane, as opposed to the first and second axial relief faces, an exact positioning of the cutting insert in an insert seat of a square shoulder milling tool may be achieved. More specifically, a deviation from a target thickness of the cutting insert, i.e. in a direction along the centre axis, will not affect axial runout of the cutting insert and the axial position of the main cutting edge, or at least will affect axial runout and the axial position of the main cutting edge only to a limited extent, when the cutting insert is mounted in an insert seat of a square shoulder milling tool. That is, thickness variations of the cutting insert do not, or substantially do not, affect the axial position of the cutting insert in the insert seat when an axial support surface in the insert seat of the shoulder milling tool extents perpendicularly or substantially perpendicularly to the rotation axis of the shoulder milling tool, seen along a tangential direction of the axial support surface. Namely, when the first axial abutment face or the second axial abutment face abuts against the axial support surface in the insert seat as discussed above, thickness variations of the cutting insert do not, or substantially not, affect the axial position of the cutting insert in the insert seat. As a result, a cutting insert configured for exact or a more exact positioning in an insert seat of a shoulder milling tool is provided and thanks to that the quality of the machined work-piece can be improved.

Since the first radial abutment face forms an obtuse third inner angle to the median plane, and since the second radial abutment face forms an obtuse fourth inner angle to the median plane, a better absorption of the cutting forces is achieved. More specifically, when the cutting insert is mounted in the insert seat of the square shoulder milling tool such that the first cutting edge is in an active position for machining of the work-piece, i.e. when the first cutting edge is in operable position, the first radial abutment face may be used to abut the radial support surface of the insert seat. Thanks to the obtuse third angle, the first radial abutment face has a more suitable orientation with regard to the direction of the total cutting force. As a result of that, the clamping arrangement, for example a screw, will be subject to less stress which increases the tool life of the clamping arrangement and the tool. Furthermore, the risk for movement of the insert is decreased and the surface quality of the machined work-piece may be increased. In some cases when the machining circumstances are such that a risk for plastic deformation of the radial support in the insert seat is predominant over the earlier mentioned risk for movement of the insert and a high stress in the clamping arrangement, both the first radial abutment face and the second radial abutment face may constitute active radial abutment faces at the same time. In such a case, the insert seat is arranged with a first radial support face and a second radial support face, wherein the first radial support face in the insert seat is arranged to be in contact with the first radial abutment face, and the second radial support face in the insert seat is arranged to be in contact with the second radial abutment face at the same time. In such a case, the area of contact between the insert and the radial support in the insert seat is increased thanks to the obtuse third angle and the obtuse fourth inner angle. As a result of that, the risk for plastic deformation of the radial support in the insert seat is decreased.

The cutting insert may herein alternatively be referred to simply as the insert. The cutting insert is configured to be fixed in an insert seat of a square shoulder milling tool. Hence, the square shoulder milling tool is configured for cutting a 90° shoulder in a workpiece.

The cutting insert may preferably be manufactured from a cemented carbide material, but it may alternatively be manufactured from or comprise e.g. one or more of ceramics, cubic boron nitride, polycrystalline diamond, and/or cermet. The cutting insert may be coated with surface coatings such as e.g. titanium nitride, titanium carbonitride, and/or aluminium oxide.

When arranged in an insert seat of a square shoulder milling tool, the first and second sides of the cutting insert face approximately in opposing tangential directions of a rotational direction of the square shoulder milling tool. The first pair of opposing side surfaces face in opposing radial directions of the square shoulder milling tool. The second pair of opposing side surfaces face in opposing axial directions of the square shoulder milling tool. The first and second sides of the cutting insert are preferably provided with flat or generally flat tangential support surfaces which are parallel or substantially parallel to the median plane.

The insert may be provided with a screw hole for a simple mounting of the insert in an insert seat of the milling tool. The screw hole has a centre axis that may be perpendicular to the median plane. The centre axis of the screw hole may coincide with the centre axis of the insert.

The circumferential surface is comprising corner surfaces extending between the first side and the second side and connecting each surface of the first pair of opposing side surface to each surface of the second pair of opposing side surfaces. Both the first axial relief face and the first axial abutment face are adjacent to a first corner surface and preferably tangentially connected to the first corner surface. Both the second axial relief face and the second axial abutment face are adjacent to a second corner surface and preferably tangentially connected to the second corner surface. Thanks to this, the second pair of opposing side surfaces are simplified which contributes to a simplification of the pressing tool parts that are creating or forming the second pair of opposing side surfaces which in its turn improves the tolerances of the final insert. A third corner surface is arranged diagonally opposite to the second corner surface, i.e. the third corner surface is extending between and connecting the first side surface of the second pair of opposing side surfaces and the second side surface of the first pair of opposing side surfaces. A fourth corner surface is arranged diagonally opposite to the first corner surface, i.e. the fourth corner surface is extending between and connecting the second side surface of the second pair of opposing side surfaces and the second side surface of the first pair of opposing side surfaces. At least one of the first radial abutment face and the second radial abutment face or, more preferably, both the first and second radial abutment face are adjacent to the third corner surface and preferably tangentially connected to the third corner surface. At least one of the first radial abutment face and the second radial abutment face or, more preferably, both the first and the second radial abutment face are adjacent to the fourth corner surface and preferably tangentially connected to the fourth corner surface. Thanks to this, the second side of the first pair of opposing side surfaces is simplified which contributes to a simplification of the pressing tool part that is creating or forming the second side of the first pair of opposing side surfaces which in its turn improves the tolerances of the final insert.

When arranged in an insert seat of a square shoulder milling tool, the main cutting edge (e.g. the first main cutting edge) is configured for cutting a 90° shoulder or wall in the workpiece, in relation to the surface-wiping secondary cutting edge (e.g. the first surface-wiping secondary cutting edge) extending in a plane perpendicular or substantially perpendicular to the axial direction of the square shoulder milling tool and configured for surface-wiping the work-piece surface extending perpendicularly to the axial direction of the square shoulder milling tool.

The main cutting edge (e.g. the first main cutting edge) extends axially away from a first axial end of the tool toward a second axial end of the tool, which second axial end is opposite to the first end of the tool. The main cutting edge has preferably but not necessarily a positive axial slope. The surface-wiping secondary cutting edge (e.g. the first surface-wiping secondary cutting edge) has a radial extension and extends in a direction from the radial periphery of the tool and radially inwardly. The surface-wiping secondary cutting edge can be oriented in a radial direction toward the rotation axis of the tool. The cutting insert is a double-sided cutting insert. The cutting insert may advantageously provide a total of four indexable cutting edges to be used for square shoulder milling.

Since the first and second axial abutment faces form substantially flat surface, the each of the first and second axial abutment face forms a surface suitable for abutting against an axial support surface in an insert seat of a square shoulder milling tool. The first axial abutment face abuts against the axial support surface when the second cutting edge is positioned in the insert seat for cutting engagement with a workpiece. The second axial abutment face abuts against the axial support surface when the first cutting edge is positioned in the insert seat for cutting engagement with a workpiece. Thus, the first axial abutment face is inactive when the first main cutting edge is positioned for cutting engagement with a workpiece in the insert seat, and the second axial abutment face is inactive when the second main cutting edge is positioned for cutting engagement with a workpiece in the insert seat.

The cutting insert is manufactured by pressing raw material in the form of powder in a die to form a green body. Multiaxial pressing (MAP) may be utilised for forming the green body. MAP makes it possible to produce green bodies with complex shapes. The green body as such is porous. When sintered, the green body is compacted, shrinks in size and forms the cutting insert. Surfaces and cutting edges of the cutting insert may be ground after sintering. Depending on the milling operations to be performed with the cutting insert in a milling tool, abutment faces of the cutting insert which are arranged to abut against support surfaces of the milling tool, may be ground to specific tolerances. Alternatively, or complementary, the radial and/or axial relief faces may be ground.

According to one embodiment of the invention, the obtuse third inner angle between the first radial abutment face and the median plane is in a range of 91-120 degrees, or within a range of 92-105 degrees, or within a range of 94-100 degrees, and the obtuse fourth inner angle between the second radial abutment face and the median plane is within a range of 91-120 degrees, or within a range of 92-105 degrees, or within a range of 94-100 degrees. The obtuse third inner angle which is less than 91 degrees gives a low effect when it comes to absorption of the cutting forces. The absorption of the cutting forces is better when the obtuse third angle has a larger value, for example when the obtuse third inner angle is at least 92 degrees or even better when the obtuse third inner angle is at least 94 degrees. However, the obtuse third inner angles larger than 120 degrees entail manufacturing difficulties and a deteriorated form stability during sintering. The form stability is even better when the value of the obtuse third inner angle is 105 degrees or lower. The form stability is best when the value of the obtuse third inner angle is 100 degrees of lower. Everything that is said about the value of the obtuse third inner angle applies also for the value of the obtuse fourth inner angle.

According to a further one embodiment of the invention, the first radial abutment face is arranged on both sides of the median plane, and the second radial abutment face is arranged on both sides of the median plane. Thanks to this, the first radial abutment face is arranged such that the insert can be given support on both sides of the median plane which is beneficial for the stability of the insert, for example when the first cutting edge is in operable position and when only the first radial abutment face constitutes active radial abutment face, and the second radial abutment face is inactive. Similarly, also the second radial abutment face is arranged such that the insert can be given support on both sides of the median plane which is beneficial for the stability of the insert when the second cutting edge is in operable position and when only the second radial abutment face constitutes active radial abutment face, and the first radial abutment face is inactive.

According to a further one embodiment of the invention, the first radial abutment face extends on a first side of the median plane towards the second side of the insert, and the second radial abutment face extends on a second side of the median plane towards the first side of the cutting insert. Thanks to this, the first radial abutment face has an increasing width when moving along the first radial abutment face towards the first side surface of the second pair of the opposing side surfaces. Thus, when the first cutting edge is in operable position and when only the first radial abutment face constitutes active radial abutment face, i.e, when the second radial abutment face is inactive, the insert may be given improved radial support in an area radially inwardly from the active cutting corner and radially inwardly from the first end of the first cutting edge, i.e. in the area of the first cutting edge where the first cutting edge is most frequently subject to radial cutting forces. This contributes to improved stability of the insert and due to that improved quality of the machined work-piece. Furthermore, the first radial abutment face has an increasing width when moving away from the second axial abutment face, which furthermore improves the stability of the insert and due to that contributes to improved surface quality of the machined surface, i.e. both the 90° wall and the workpiece surface extending perpendicularly to the axial direction of the square shoulder milling tool. For the same reasons, the second radial abutment face has an increasing width when moving along the second radial abutment face towards the second side surface of the second pair of the opposing side surfaces. Thus, when the second cutting edge is in operable position and when only the second radial abutment face constitutes active radial abutment face, i.e., when the first radial abutment face is inactive, the insert may be given improved radial support in the area radially inwardly from the active cutting corner and radially inwardly from the first end of the second cutting edge, i.e. in the area of the second cutting edge where the second cutting edge is most frequently subject to radial cutting forces. This contributes to improved stability of the insert and due to that improved quality of the machined work-piece. The second radial abutment face has an increasing width when moving away from the first axial abutment face.

According to a further one embodiment of the invention, the first axial abutment face may form a substantially flat surface extending from the median plane towards the second side, and the second axial abutment face may form a substantially flat surface extending from the median plane towards the first side. In this manner, each of the first and second axial abutment faces may form surfaces suitable for abutting against a corresponding axial support surface in an insert seat of a milling tool. Additionally, the insert is supported axially at a position close to the active side of the insert, i.e. the side of the cutting insert where the main cutting edge engages with a work-piece, which contributes to an improved stability of the inset and due to that improved quality of the machined work-piece. Moreover, the cutting insert may be manufacture utilising MAP with improved form stability during sintering. Namely, the first and second surface groupings thus, may not comprise any recesses, which may affect the form stability of the cutting insert when the green body is sintered after a MAP operation.

According to a further one embodiment of the invention, the first axial abutment face may form a substantially flat surface extending from the median plane to the second side, and the second axial abutment face may form a substantially flat surface extending from the median plane to the first side. In this manner, each of the first and second axial abutment faces may form surfaces suitable for abutting against a corresponding axial support surface in an insert seat of a milling tool. Additionally, the insert is supported axially as close as possible to the active side of the insert, i.e. the side that is involved in the cutting process, and as far as possible from the inactive side of the insert, parts of which serve as tangential and radial support of the insert. This contributes to an improved stability of the insert and due to that improved quality of the machined work-piece. Moreover, the cutting insert may be manufacture utilising MAP with improved form stability during sintering. Namely, the first and second surface groupings thus, may not comprise any recesses, which may affect the form stability of the cutting insert when the green body is sintered after a MAP operation.

According to a further one embodiment, seen in the direction along the first axis and projected on the central plane, the first axial abutment face may form at least 30% of the first surface grouping, and the second axial abutment face may form at least 30% of the second surface grouping. In this manner, the first and second axial abutment faces may form a large part of each of the first and second surface groupings, respectively. As such, each of the first and second axial abutment faces may provide stable axial support when abutting against an axial support surface in an insert seat of the milling tool. Moreover, good form stability may be provided during sintering of the cutting insert.

According to a further one embodiment, seen in the view along the first axis, at least a part of the first axial abutment face may be arranged between the second side and at least a part of the first surface-wiping secondary cutting edge or at least a major part of the first surface-wiping secondary cutting edge and wherein at least a part of the second axial abutment face is arranged between the first side and at least a part of the second surface-wiping secondary cutting edge or at least a major part of the second surface-wiping secondary cutting edge. In this manner, when the first axial abutment face abuts against an axial support surface in an insert seat of a milling tool, an axial support of the cutting insert is provided along an axial direction from the second surface-wiping secondary cutting edge, which is positioned for cutting engagement with a workpiece. Thus, the axial support is provided at the shortest distance from the active, second surface-wiping secondary cutting edge. As for a given tolerance, an increased length provides for a larger error, this provides for a small axial length error. Additionally, the axial support may be provided axially straight above the active surface-wiping secondary cutting edge, which contributes to better absorption of the axial forces and better stability of the insert.

According to a further one embodiment, seen in a view along the centre axis on the first side of the longitudinal plane, for part of the cutting insert which is between the median plane and the second side, the first axial abutment face forms a surface of the first surface grouping which is the most distant surface of the cutting insert from the centre axis C. In this manner, no recesses are provided in the first surface grouping between the median plane and the second side. Accordingly, the cutting insert may be manufacture utilising MAP with improved form stability during sintering. The lack of recesses has a positive effect on the form stability of the cutting insert when the green body is sintered after a MAP operation. Similarly, and for the same reason, for part of the cutting insert which is between the median plane and the first side, the second axial abutment face forms a surface of the second surface grouping which is the most distant surface of the cutting insert from the centre axis C.

According to a further one embodiment, seen in the view along the centre axis, the first main cutting edge may be angled from the first end towards the longitudinal plane. In this manner, a strong first main cutting edge may be provided since the first main cutting edge is supported by the body of the insert underneath the first main cutting edge.

According to a further one embodiment, seen in the view along the centre axis, the first axial abutment face may form a fifth inner angle δ with the longitudinal plane within a range of 75-89 degrees. In this manner, the first axial abutment face may be arranged with a relief towards the longitudinal plane. Thus, the first axial abutment face may be easily manufactured in a MAP operation. Furthermore, in this manner, an axial force applied to the cutting insert during a milling operation, when the second cutting edge is in operable position, may provide a radial force component at the first axial support surface pushing against the cutting insert radially inwardly into the insert seat. Additionally, the area of the first axial abutment face can be enlarged. Thus, the cutting insert may be more securely positioned in the insert seat. Similarly, and for the same reasons, the second abutment face may form an inner angle with the longitudinal plane within a range of 75-89 degrees. Preferably, but not necessarily, the fifth inner angle of the first axial abutment face is equal to the inner angle of the second abutment face.

According to a further one embodiment, the insert has 180° rotational symmetry with respect to rotation about the second axis and a third cutting edge may extend along an intersection between the second side and the circumferential surface on a second side of the longitudinal plane, the third cutting edge, as seen in a view towards the second side, extending along a third corner of the cutting insert, wherein the third cutting edge comprises a third main cutting edge, a third corner cutting edge, and a third surface-wiping secondary cutting edge, wherein the third main cutting edge adjoins the third corner cutting edge, and the third corner cutting edge adjoins the third surface-wiping secondary cutting edge. The second side surface of the first pair of opposing side surfaces comprises a third radial relief face arranged adjacent to the third main cutting edge. When seen in a view along the centre axis toward the second side of the cutting insert, at least part of the third radial relief face extends outside of the third main cutting edge at least along a part of the third main cutting edge. The first radial abutment face extends between the third radial relief face and the second radial abutment face. In this manner, a further cutting edge may be provided on the cutting insert. Moreover, with the 180° rotational symmetry with respect to rotation about the second axis a corresponding fourth cutting edge may be proved on the second side of the longitudinal plane at the second side surface of the second pair of opposing side surfaces. Thanks to the arrangement where the first radial abutment face extends between the third radial relief face and the second radial abutment face, in combination with the fact that at least part of the third radial relief face extends outside of the third main cutting edge at least along a part of the third main cutting edge, the first radial abutment face is less subject to erosion and damages, that may be caused by chips and dust when the third cutting edge is in operable position. As the insert has 180° rotational symmetry with respect to rotation about the second axis, the insert is also arranged with a third radial abutment face adjacent to the first radial relief face. The third radial abutment face is also less subject to erosion and damages when the first cutting edge is in operable position. A radial abutment face with a lower degree of erosion gives better and more accurate radial support when it constitutes active radial abutment support, i.e. when it is in operable position. This contributes to improved tolerances of the tool and an improved stability of the insert and due to that improved quality of the machined work-piece.

According to a further one embodiment, the first side surface of the first pair of opposing side surfaces comprises a second radial relief face arranged adjacent to the second main cutting edge. When seen in a view along the centre axis and towards the second side of the cutting insert, at least part of the second radial relief face extends outside of the second main cutting edge at least along a part of the second main cutting edge. Thanks to this, during manufacturing of the cutting insert, the second main cutting edge may be given improved properties by treating only the second radial relief face. Preferably, the second radial relief face has a warrying width measured in a direction from the second main cutting edge perpendicularly towards the median plane. Thanks to this, the second main cutting edge may be given a desired geometry and curvature for improved quality of the machined 90° wall in the work-piece. Preferably, the second radial relief face extends more outside the second main cutting edge at a second end of the second main cutting edge than at the first end of the main cutting edge. Thanks to this, the insert seat may be given a more advantageous axial tipping-in angle. Preferably, the first radial relief face may be a curved surface or a helically twisted surface. Preferably, the second radial relief face extends more outside the second main cutting edge towards the second end of the second main cutting edge than towards the first end of the second main cutting edge. The first side surface of the first pair of opposing side surfaces comprises a third radial abutment face and a fourth radial abutment face, wherein the third radial abutment face extends between the first radial relief face and the fourth radial abutment face in the same way as the first radial abutment face extends between the third radial relief face and the second radial abutment face. The fourth radial abutment face extends between the second radial relief face and the third radial abutment face in the same way as the second radial abutment face extends between the first radial abutment face and the first side of the cutting insert. In other words, the third radial abutment face forms an obtuse inner angle to the median plane, which obtuse inner angle is equal to the obtuse third inner angle that the first radial abutment face forms to the median plane. Also, the fourth radial abutment face forms an obtuse inner angle to the median plane, which obtuse inner angle is equal to the obtuse fourth inner angle that the second radial abutment face forms to the median plane. In this manner, the insert is provided with the second radial relief face adjacent to the second main cutting edge, and a third radial abutment face and a fourth radial abutment face. Thus, also the fourth radial abutment face is less subject to erosion and damages when the second cutting edge is in operable position. As the insert has 180° rotational symmetry with respect to rotation about the second axis, also the second radial abutment face is less subject to erosion and damages when the fourth cutting edge is in operable position. This contributes to improved tolerances of the tool and an improved stability of the insert and due to that improved quality of the machined work-piece.

According to a further one embodiment, seen in the direction along the first axis towards the first side surface of the second pair of opposing side surfaces, a third axial relief face adjacent to the third auxiliary cutting edge and a third axial abutment face may form part of a third surface grouping on the second side of the longitudinal plane, wherein the first surface grouping and the third surface grouping meet in a partitioning line, wherein the partitioning line extends in the longitudinal plane, and wherein the partitioning line extends from the first side to the second side. In this manner, the first and third axial relief faces are formable in a MAP operation. Moreover, also the first and third surface groupings are formable in a MAP operation. More specifically, a MAP pressing tool for forming a green body comprises two parts configured for forming the circumferential surface. The two parts can be retracted after the MAP operation in a linear path of motion from the finish-pressed green body in such a way that each point on the surfaces of the two parts immediately clears from the green body. Thus, the cutting insert is configured for manufacturing utilising MAP.

According to embodiments, in the median plane an obtuse seventh inner angle may be formed between the first surface grouping and the third surface grouping. The seventh inner angle may be in the interval from 150-178 degrees, preferably in the interval from 164-172 degrees, preferably approximately 168 degrees.

According to embodiments, the partitioning line may form a distinct line, and/or the partitioning line may extend in a straight line, and/or the partitioning line may extend perpendicularly to the median plane. In this manner, the first and third surface groupings may be easily formable in a MAP operation. More specifically, the pressing tool to be utilised in the MAP operation is easily manufactured. For instance, the partitioning line of the cutting insert may be formed where two parts of the pressing tool abut against each other. Moreover, the cutting insert may be manufacture utilising MAP with improved form stability during sintering. Namely, at the least along the partitioning line, the cutting insert thus, may not comprise any recesses, which may affect the form stability of the cutting insert when the green body is sintered after a MAP operation.

According to embodiments, the first axial abutment face and the third axial abutment face together continuously extend along a first side surface of the second pair of opposing side surfaces, when seen in the view along the first axis. Thanks to this, a simplified first side surface is created which improves the sintering form stability, and due to that improves tolerances of the insert.

According to embodiments, seen in any section through the partitioning line and in parallel with the median plane, the partitioning line may extend immediately adjacent to the first axial abutment face and/or the third axial abutment face. In this manner, only the first axial abutment face and/or the third axial abutment face extend up to the partitioning line. Thus, the number of surfaces creating the partitioning line is limited and due to that the pressing tool for forming the cutting insert using MAP is simplified. In addition to cost efficient manufacturing of the pressing tool also insert tolerances are decreased.

According to embodiments, the cutting insert has 180° rotational symmetry with respect to rotation about the second axis and/or the first axis and/or the centre axis.

According to embodiments, when seen in the view along the first axis the first axial relief face may have a height in a direction parallel with the longitudinal plane and projected on the central plane, wherein the height may increase in a direction away from the longitudinal plane towards the first corner cutting edge. In this manner, the first axial relief face has its largest height in the vicinity of the first corner cutting edge. Thus, the risk of fractures of the cutting insert close to the cutting edge at the first axial relief face is decreased. Namely, the area in the vicinity of the corner cutting edge is subject to significant loads during milling. A large height of the first axial relief face means that a transition to an adjacent surface is arranged at a fair distance from the cutting edge. Thus, stress concentration in the transition is formed at a distance from the cutting edge, which decrease the risk of fracture close to the cutting edge.

According to a further aspect, there is provided a milling tool configured to be rotated about a rotation axis comprising a tool body, wherein the tool body at a first axial end portion thereof is provided with an insert seat for receiving a cutting insert. The milling tool comprises a cutting insert according to any one of the preceding embodiments arranged in the insert seat. In this manner, a milling tool is provided with an exactly positioned cutting insert in the insert seat. More specifically, a deviation from a target thickness of the cutting insert, i.e. in a direction along the centre axis of the cutting insert, will not affect axial runout of the cutting insert, or at least will affect axial throw/runout only to a limited extent, when the cutting insert is mounted in the insert seat of the milling tool. That is, thickness variations of the cutting insert do not, or substantially not, affect the axial position of the cutting insert in the insert seat when an axial support surface in the insert seat of the shoulder milling tool extents perpendicularly or substantially perpendicularly to the rotation axis of the shoulder milling tool, seen along a tangential direction of the axial support surface. Namely, when the first axial abutment face or the second axial abutment face abuts against the axial support surface in the insert seat as discussed above, thickness variations of the cutting insert do not, or substantially not, affect the axial position of the cutting insert in the insert seat. As a result, a milling tool comprising a cutting insert exactly positioned in an insert seat of a shoulder milling tool is provided. Furthermore, since the first radial abutment face forms an obtuse third inner angle to the median plane, and since the second radial abutment face forms an obtuse fourth inner angle to the median plane, a better absorption of the cutting forces is achieved. More specifically, when the cutting insert is mounted in the insert seat of the square shoulder milling tool such that the first cutting edge is in an active position for machining of the work-piece, i.e. when the first cutting edge is in operable position, the first radial abutment face may be used to abut the radial support surface of the insert seat. Thanks to the obtuse third angle, the first radial abutment face has a more suitable orientation with regard to the direction of the total cutting force. As a result of that, the clamping arrangement, for example a screw, will be subject to less stress which increases the tool life of the clamping arrangement and the tool.

The milling tool may be a square shoulder milling tool.

According to one embodiment, the insert seat may be provided with a tangential support surface, a first radial support surface, and an axial support surface. In this manner, a secure positioning of the cutting insert in the insert seat may be provided.

The first radial support surface and/or the axial support surface may be intersected by the median plane of the cutting insert when the insert is mounted in the insert seat. In this manner, a secure positioning of the cutting insert in the insert seat may be provided. At least a part of the axial support surface and/or at least a part of the radial support surface may be situated on the same side of the median plane as the cutting edge which is in the operable position, when the insert is mounted in the insert seat. In this manner, a secure and stable positioning of the cutting insert in the insert seat may be provided. At least a part of the axial support surface and/or at least a part of the radial support surface may be situated on the same side of the median plane as the cutting edge which is in the operable position, when the insert is mounted in the insert seat at the same time as at least a second part of the axial support surface and/or at least a second part of the radial support surface is situate on the opposite side of the median plane. In this manner, a secure and stable positioning of the cutting insert in the insert seat may be provided.

According to a further one embodiment, the first radial support surface extends at a sharp eight angle to the tangential support surface, when seen in a section through the insert seat and in parallel with the central plane when the cutting insert is mounted in the insert seat. A sum of the sharp eight angle and the obtuse third inner angle is in a range of 179-181 degrees, or within a range of 179.5-180.5 degrees or 180 degrees. When the sum of the sharp eight angle and the obtuse third inner angle is 180 degrees, the first radial support surface extends at the obtuse third inner angle to the median plane when the insert is mounted in the insert seat. In this manner, the first radial support surface and the first radial abutment face extend at same angle relative to the median plane, when the insert is mounted in the insert seat and the first cutting edge is in operable position. In this manner, a secure and stable positioning of the cutting insert in the insert seat may be provided. Due to the manufacturing tolerances, the sum of the sharp eight angle and the obtuse third inner angle may deviate between 179 and 181 degrees.

According to a further one embodiment, the axial support surface may extend perpendicularly or substantially perpendicularly to the tangential support surface. In this manner, a secure a positioning of the cutting insert in the insert seat may be provided.

According to a further one embodiment, the axial support surface may extend in a first support plane, and the first support plane may cross the rotation axis on a side of the insert seat opposite to the first axial end portion. In this manner, an axial force applied to the cutting insert during a milling operation may provide a radial force component at the axial support surface pushing against the cutting insert radially inwardly. Thus, the cutting insert may be securely positioned in the insert seat.

According to a further one embodiment, the first radial support surface may extend in a second support plane, and the second support plane may cross the rotation axis on a same side of the insert seat as the first axial end portion. In this manner, the first main cutting edge of the cutting insert may be arranged to extend substantially on the wall of a cylinder having same centre axis as the rotation axis of the milling tool. Thus, a milling operation in a workpiece may result in a 90° workpiece surface extending substantially in parallel with the rotation axis of the milling tool. Namely, since seen in the view along the centre axis, at least part of the first radial relief face extends outside of the first main cutting edge at least along a part of the first main cutting edge such that the first radial relief face extends more outside the first main cutting edge towards a second end of the main cutting edge than towards the first end of the main cutting edge, the above discussed direction of the second support plane, tilts the first main cutting edge towards a position giving a 90° wall surface in the work-piece having a parallel extension with the rotation axis.

According to a further one embodiment, the cutting insert and the insert seat may be arranged such that a portion of the second side is abutting against the tangential support surface, the first radial abutment face is abutting against the first radial support surface, and the second axial abutment face is abutting against the axial support surface, when the first cutting edge is in operable position. In this manner, the cutting insert may be securely positioned in the insert seat.

According to a further one embodiment, the insert seat is provided with a second radial support surface extending at an obtuse ninth angle to the tangential support surface, when seen in a section through the insert seat and in parallel with the central plane when the cutting insert is mounted in the insert seat. An absolute value of a difference between the obtuse ninth angle µ2 and the obtuse fourth inner angle W' may be $|µ2-W'|≤1°$, or $|µ2-W'|≤0.5°$, or $|µ2-W'|=0°$. The obtuse ninth angle may be equal to the obtuse fourth inner angle. In this manner, a larger area contact may be obtained between the radial abutment faces and the radial support surfaces as the second radial abutment face may abut against the second radial support surface at the same time as the first radial abutment face is abutting against the first radial support surface, when the insert is mounted in the insert seat and the first cutting edge is in operable position. Due to the manufacturing tolerances, the absolute value of the difference between the obtuse ninth angle µ2 and the obtuse fourth inner angle W' may be up to 1°.

According to a further one embodiment, the insert seat is configured to provide an axial rake angle for the median plane of the cutting insert arranged in the insert seat, and wherein the insert seat is configured to provide an axial rake angle γp equal to 0 degrees or a negative axial rake angle γp having an absolute value within a range of $0<|γp|≤3$ degrees, or within a range of $0.5≤|γp|≤2$ degrees, or of approximately 1 degree. In this manner, a low tilting of the cutting insert in an axial direction of the milling tool may be provided. Thus, provisions for an exact positioning of the cutting insert in the insert seat may be achieved. A deviation from a target thickness of the cutting insert, i.e. in a direction along the centre axis of the cutting insert, may not affect axial runout of the cutting insert, or at least may affect axial throw/runout only to a limited extent. When the axial support surface in the insert seat extents perpendicularly or substantially perpendicularly to the rotation axis of the milling tool, seen in a tangential direction of the axial support surface, the first axial abutment face of the cutting insert extending perpendicularly to the median plane, entails that thickness variations of the cutting insert do not affect the axial position of the cutting insert in the insert seat.

According to a further one embodiment, the insert seat is configured to provide a negative radial rake angle for the median plane of the cutting insert arranged in the insert seat, and wherein the insert seat is configured to provide a negative radial rake angle γf having an absolute value within a range of $10≤|γf|≤30$ degrees, or within a range of $15≤|γf|≤25$ degrees. In this manner, a functional positive relief angle of the main cutting edge may be formed by the radial rake angle. Namely, since seen in the view along the centre axis, at least part of the first radial relief face extends outside of the first main cutting edge at least along a part of the first main cutting edge such that the first radial relief face extends more outside the first main cutting edge towards a second end of the main cutting edge than towards the first end of the main cutting edge, the above discussed negative radial rake angle, tilts the cutting insert in a radial direction such that a functional positive relief angle is provided at first main cutting edge.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which:

FIGS. 1a-1g illustrate different views of a cutting insert according to a first embodiment.

DETAILED DESCRIPTION

Figure 1A:
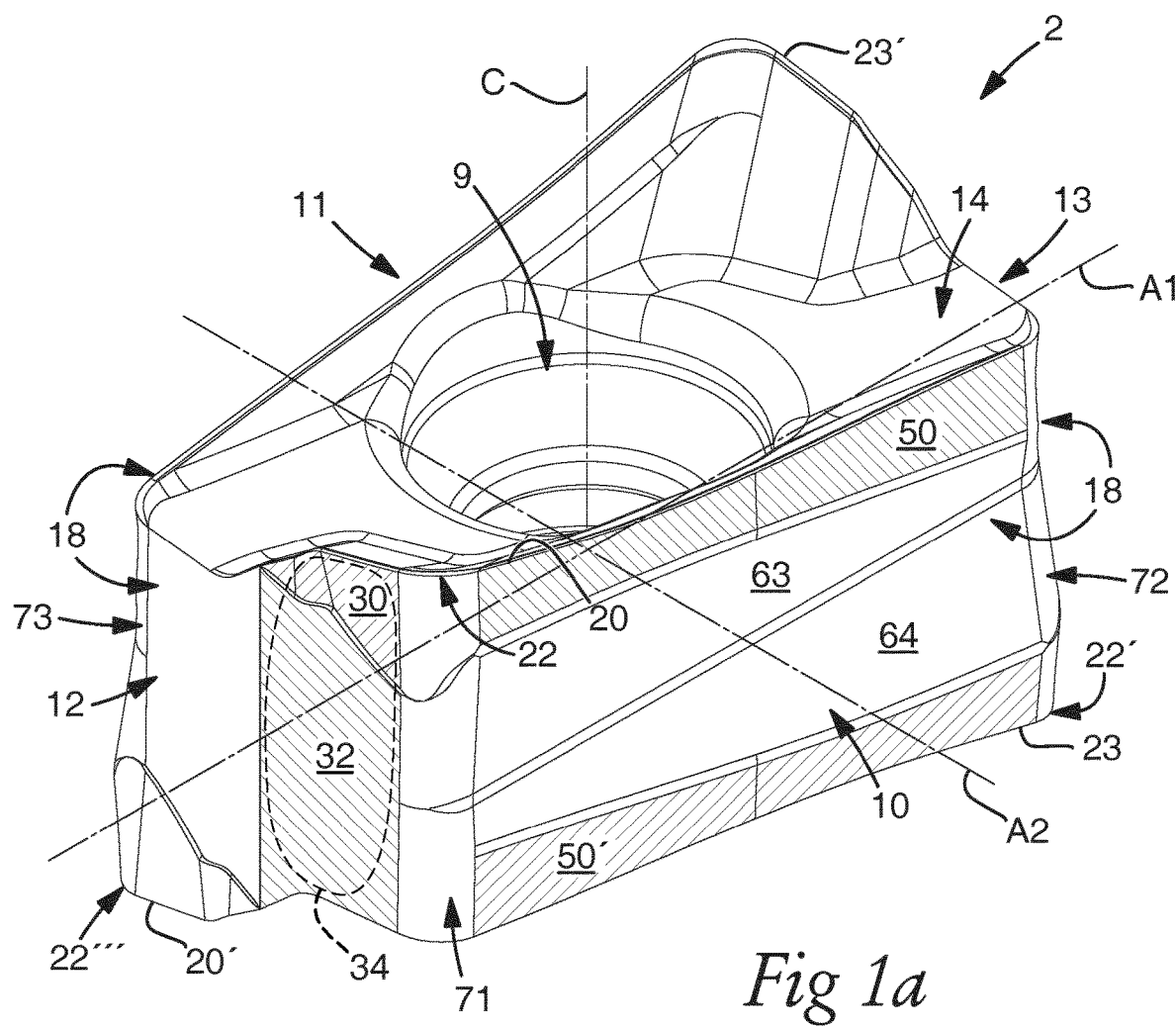

Aspects and/or embodiments will now be described more fully. Like numbers refer to like elements throughout. Well-known functions or constructions will not necessarily be described in detail for brevity and/or clarity. In the following, reference is made to various inner angles. Herein, an inner angle means that the angle is seen and/or measured within a body, or at least mainly within a body, of a cutting insert.

FIGS. 1a-1g illustrate different views of a cutting insert 2 according to a first embodiment. The cutting insert 2 is configured for use in a milling tool, more specifically in a square shoulder milling tool. The cutting insert 2 comprises a first side 14, a second side 16 opposite to the first side 14, and a circumferential surface 18 extending between the first side 14 and the second side 16. The circumferential surface 18 comprises a first pair of opposing side surfaces 10, 11, and a second pair of opposing side surfaces 12, 13, see FIGS. 1a, 1d and 1g.

The first side 14 defines a first extension plane P1. The second side 16 defines a second extension plane P2. A centre axis C extends perpendicularly through the first and second extension planes P1, P2. In these embodiments, the cutting insert 2 comprises a through hole 9 for securing the cutting insert 2, e.g. by means of a screw, in an insert seat of a milling tool. The through hole 9 extends centrally through the cutting insert 2. The centre axis C extends along a centre of the through hole 9. According to alternative embodiments, wherein the cutting insert does not comprise a through hole, the cutting insert may instead be secured in an insert seat of a milling tool by clamping means.

A median plane MP extends halfway between the first extension plane P1 and the second extension plane P2. The median plane MP extends in parallel with the first and second extension planes P1, P2. A longitudinal plane LP extends halfway between the first pair of opposing side surfaces 10, 11, perpendicularly to the median plane MP and containing the centre axis C. A central plane CP extends perpendicularly to both the median plane MP and the longitudinal plane LP and contains the centre axis C. A first axis A1 extends along an intersection between the median plane MP and the longitudinal plane LP. A second axis A2 extends along an intersection between the median plane MP and the central plane CP. The centre axis C and the first and second axes A1, A2 are shown in FIGS. 1a and 1d.

The first and second extension planes P1, P2, the median plane MP, the longitudinal plane LP, and the central plane CP are imaginary planes, and are shown in FIGS. 1e-1g. The median plane MP extents through the entire circumferential surface 18. The longitudinal plane LP extents through the second pair of opposing side surfaces 12, 13. The central plane CP extents through the first pair of opposing side surfaces 10, 11.

At the first side 14 the cutting insert 2 comprises a first surface 15 extending between the circumferential surface 18. The first surface 15 may be substantially flat along parts thereof. In other parts, such as closer to cutting edges, the first surface 15 may be raised, e.g. in order to provide one or more rake faces. At the second side 14 the cutting insert 2 comprises a first second surface 17 extending between the circumferential surface 18. The second surface 17 may be substantially flat along parts thereof. In other parts, such as closer to cutting edges, the second surface 17 may be raised, e.g. in order to provide one or more rake faces.

Figure 1D:
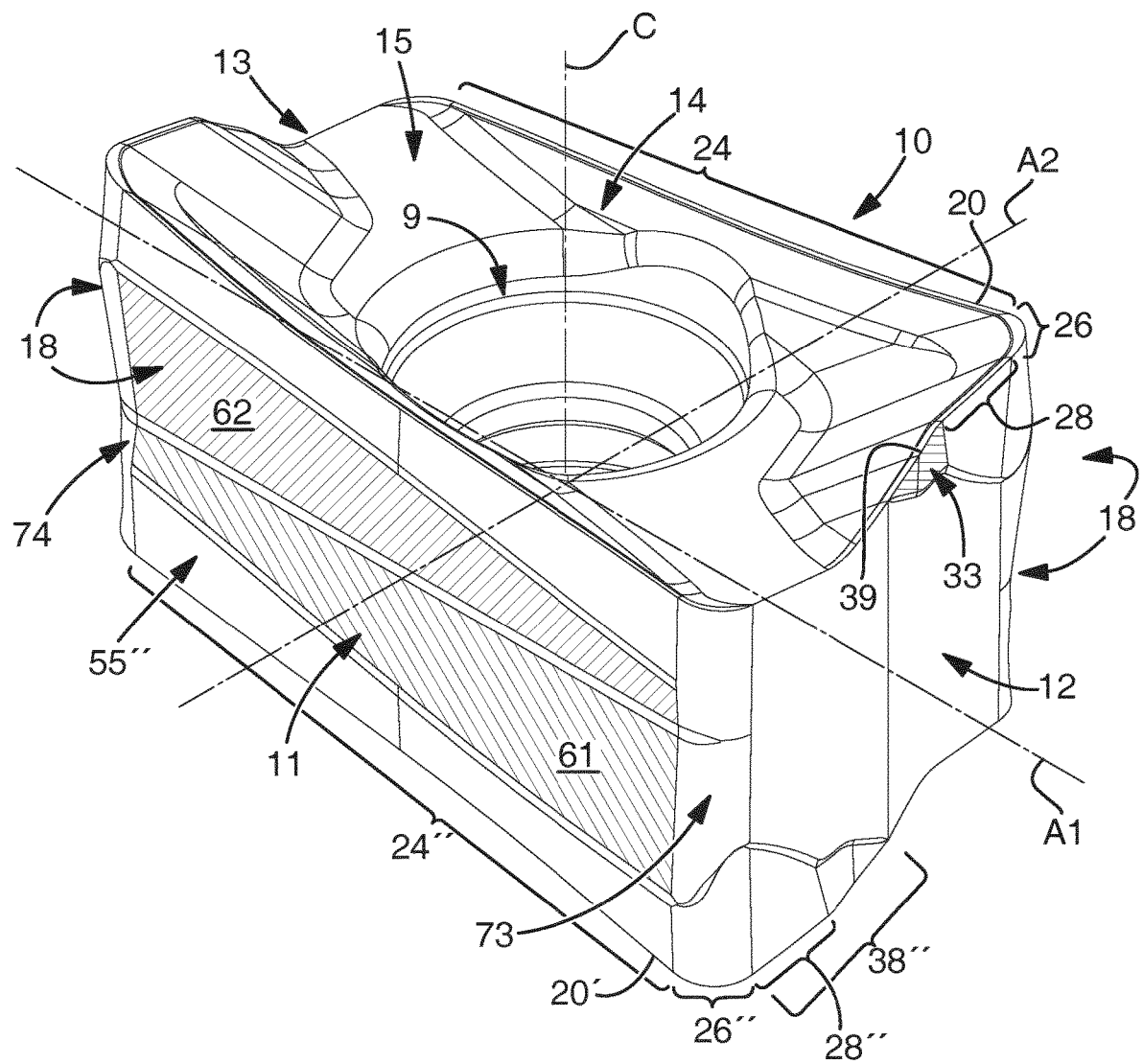

A first cutting edge 20 extends along an intersection between the first side 14 and the circumferential surface 18 on a first side of the longitudinal plane LP, see e.g. FIGS. 1a, 1c, and 1g. The first cutting edge 20, as seen in a view towards the first side 14, i.e. in a view along the centre axis C (FIG. 1f), extends along a first corner 22 of the cutting insert 2. A second cutting edge 23 extends along an intersection between the second side 16 and the circumferential surface 18 on the first side of the longitudinal plane LP, see e.g. FIGS. 1a-1c. The second cutting edge 23, as seen in a view towards the second side 16, extends along a second corner 22' of the cutting insert 2.

The first cutting edge 20 extends along an intersection between the first side 14 and a first side surface 10 of the first pair of opposing side surfaces 10, 11 and a first side surface 12 of the second pair of opposing side surfaces 12, 13. The second cutting edge 23 extends along an intersection between the second side 16 and the first side surface 10 of the first pair of opposing side surfaces 10, 11 and a second side surface 13 of the second pair of opposing side surfaces 12, 13.

The first cutting edge 20 comprises a first main cutting edge 24, a first corner cutting edge 26, and a first auxiliary cutting edge 38. The first auxiliary cutting edge 38 comprises a first surface-wiping secondary cutting edge 28. The first main cutting edge 24 adjoins the first corner cutting edge 26, and the first corner cutting edge 26 adjoins the first surface-wiping secondary cutting edge 28. The second cutting edge 23 comprises a second main cutting edge 24', a second corner cutting edge 26', and a second auxiliary cutting edge 38'. The second auxiliary cutting edge 38' comprising a second surface-wiping secondary cutting edge 28'. The second main cutting edge 24' adjoins the second corner cutting edge 26' at a first end 27' of the second main cutting edge 24', and the second corner cutting edge 26' adjoins the second surface-wiping secondary cutting edge 28'. The first auxiliary cutting edge 38 and the second auxiliary cutting edge 38' need not to have cutting ability along their respective last part close to the longitudinal plane LP. It is enough for the performance that the first surface-wiping secondary cutting edge 28 and a second cutting edge part 39 have cutting ability. The same is valid for corresponding parts of the second auxiliary cutting edge 38'.

When seen along the second axis A2, in the view of FIG. 1g, the first main cutting edge 24 has a concave shape. The same applies to the other main cutting edges. However, the shape of the main cutting edges may also be convex or straight when seen along the second axis A2.

A third cutting edge 20' extends along an intersection between the second side 16 and the circumferential surface 18 on a second side of the longitudinal plane LP. The third cutting edge 20', as seen in a view towards the second side 16, i.e. in a view along the centre axis C, extends along a third corner 22''' of the cutting insert 2, see e.g. FIGS. 1a and 1c. The third cutting edge 20' extends along an intersection between the second side 16 and a second side surface 11 of the first pair of opposing side surfaces 10, 11 and the first side surface 12 of the second pair of opposing side surfaces 12, 13.

The third cutting edge 20' comprises a third main cutting edge 24'', a third corner cutting edge 26'', and a third auxiliary cutting edge 38''. The third auxiliary cutting edge 38'' comprises a third surface-wiping secondary cutting edge 28'': The third main cutting edge 24'' adjoins the third corner cutting edge 26'', and the third corner cutting edge 26'' adjoins the third surface-wiping secondary cutting edge 28''.

In these embodiments, the cutting insert 2 further comprises a fourth cutting edge 23' arranged opposite to the first and third cutting edges 20, 23. The fourth cutting edge 23' extends along an intersection between the first side 14 and the second side surface 11 of the first pair of opposing side surfaces 10, 11 and the second side surface 13 of the second pair of opposing side surfaces 12, 13.

In these embodiments, the insert 2 has 180° rotational symmetry with respect to rotation about each of the second axis A2, the first axis A1, and the centre axis C. According to alternative embodiments, wherein the cutting insert has less than four cutting edges, the insert may have 180° rotational symmetry with respect to rotation about the second axis A2.

In these embodiments, the cutting insert 2 is double-sided and four times indexable, i.e. the cutting insert 2 comprises four identical cutting edges 20, 23, 20', 23' in total, such that the cutting insert 2 can be mounted in four different index positions in the square shoulder milling tool, to provide one active cutting edge at a time for milling a workpiece.

For each of the cutting edges 20, 23, 20', 23' the following applies. When arranged in the shoulder milling tool, the main cutting edge 24 is extending in an axial direction of the shoulder milling tool and is fed into a workpiece, in a radial direction of the shoulder milling tool. The auxiliary cutting edge 38 and the surface-wiping secondary cutting edge 28 is extending in a radial direction of the shoulder milling tool. In a shoulder milling operation, the main cutting edge 24 performs a major cut into the workpiece, while the surface-wiping secondary cutting edge 28 only performs a shallow surface smoothing cut. The auxiliary cutting edge 38 and the surface-wiping secondary cutting edge 28 is inclined in relation to the median plane MP such that a distance to the median plane MP increases in a direction away from the longitudinal plane LP and toward the corner cutting edge 26. Accordingly, close to the corner cutting edge 26 the auxiliary cutting edge 38 extends farther from the median plane MP than towards the longitudinal plane LP.

The second side surface 11 of the first pair of opposing side surfaces 10, 11 comprises a first radial abutment face 61 and a second radial abutment face 62, see e.g. FIG. 1d. The first radial abutment face 61 is sandwiched from opposite sides between the second side 16 of the cutting insert 2 and the second radial abutment face 62. In the same way, the second radial abutment face 62 is sandwiched from opposite sides between the first side 14 of the cutting insert 2 and the first radial abutment face 61. There is a smoothly curved transition between the first and second radial abutment face. The first and second radial abutment faces are tangentially connected to the smoothly curved transition. The first radial abutment face 61 of the cutting insert 2, according to the first embodiment, is arranged and extends on a first side of the median plane MP towards the second side 16, see e.g. FIG. 1g. The second radial abutment face 62 of the cutting insert 2, according to the first embodiment, is arranged and extends on a second side of the median plane MP towards the first side 14. The smoothly curved transition between the first and second radial abutment face is intersected by the median plane MP. The first radial abutment face 61 has an increasing width when moving along the first radial abutment face 61 away from the second axial abutment face 32', i.e. in a direction from the second side surface 13 of the second pair of opposing side surfaces 12, 13 towards the first side surface 12 of the second pair of opposing side surfaces, see e.g. FIG. 1d and FIG. 1g. Thus, the first radial abutment face 61 has an increased width in the area radially inwardly from the first corner cutting edge 26 and the first end 27 of the first main cutting edge 24. The width is measured in a direction from the first side 14 perpendicularly towards the second extension plane P2.

The first side surface 10 of the first pair of opposing side surfaces 10, 11 comprises a third radial abutment face 63 and a fourth radial abutment face 64, see e.g. FIG. 1a. The third radial abutment face 63 is sandwiched from opposite sides between the first side 14 of the cutting insert 2 and the fourth radial abutment face 64. The fourth radial abutment face 64 is sandwiched from opposite sides between the second side 16 of the cutting insert 2 and the third radial abutment face 63. There is a smoothly curved transition between the third and fourth radial abutment face. A smoothly curved transition is a continuously curved transition without sharp edges. The third and fourth radial abutment faces are tangentially connected to the smoothly curved transition. The third radial abutment face 63 is arranged and extends on the second side of the median plane MP towards the first side 14. The fourth radial abutment face 64 is arranged and extends on the first side of the median plane MP towards the second side 16.

The first pair of opposing side surfaces 10, 11 are configured to face radially inwardly and outwardly when arranged in an insert seat of a milling tool. The second pair of opposing side surfaces 12, 13 are configured to face in two opposite axial directions when arranged in the insert seat of the milling tool. Accordingly, each of the first pair of opposing side surfaces 10, 11 comprises two radial relief faces and two radial abutment faces, and each of the second pair of opposing side surfaces 12, 13 comprises two axial relief faces and two axial abutment faces.

A relationship W:L between a width W of the cutting insert 2 along the central plane CP and a length L of the cutting insert along the longitudinal plane LP may be within a range of 1:1.2 to 1:2. Mentioned purely as an example, e.g. W=10.76 mm and L=17.79 mm. The first and second corner cutting edges 26, 26' may have a cutting insert corner radius for forming a standard corner radius in a workpiece, such as a radius of e.g. 0.8 mm, or 1.2 mm, or 1.6 mm, or any other standard or non-standard corner radius value.

A first axial relief face 30 is arranged adjacent to the first auxiliary cutting edge 38. The first axial relief face 30 is indicated with hatching in a first direction in FIG. 1a. Seen in a direction along the first axis A1 towards the first side surface 12 of the second pair of opposing side surfaces 12, 13, the first axial relief face 30 and a first axial abutment face 32 form part of a first surface grouping 34 on the first side of the longitudinal plane LP. The first axial abutment face 32 is indicated with hatching in a second direction in FIG. 1a. The first axial abutment face 32 is configured to abut against an axial support surface in an insert seat of a shoulder milling tool when the second cutting edge 23 is positioned to form an active cutting edge in the milling tool. In FIG. 1a the first surface grouping 34 is only roughly indicated with a broken line. The first surface grouping 34 may comprise further surfaces, such as e.g. a transitional surface between the first axial relief face 30 and the first axial abutment face 32.

A second axial relief face 30' is arranged adjacent to the second auxiliary cutting edge 38'. The second axial relief face 30' is indicated with hatching in a first direction in FIG. 1b. Seen in a direction along the first axis A1 towards the first side surface 12 of the second pair of opposing side surfaces 12, 13, the second axial relief face 30' and a second axial abutment face 32' form part of a second surface grouping 34' on the first side of the longitudinal plane LP. The second axial abutment face 32' is indicated with hatching in a second direction in FIG. 1b. The second axial relief face 30', the second axial abutment face 32', and the second surface grouping 34' are shown e.g. in FIG. 1b. The second axial abutment face 32' is configured to abut against an axial support surface in an insert seat of a milling tool when the first cutting edge 20 is positioned to form an active cutting edge in the shoulder milling tool. In FIG. 1b the second surface grouping 34' is only roughly indicated with a broken line. The second surface grouping 34' may comprise further surfaces, such as e.g. a transitional surface between the second axial relief face 30' and the second axial abutment face 32'.

The first surface grouping 34 and the second surface grouping 34' form part of the circumferential surface 18. More specifically, the first grouping 34 forms part of the first side surface 12 of the second pair of opposites side surfaces 12, 13, and the second surface grouping 34' forms part of the second side surface 13 of the second pair of opposites side surfaces 12, 13.

The circumferential surface 18 is comprising four corner surfaces 71, 72, 73, 74 extending between the first side 14 and the second side 16 and connecting each surface of the first pair of opposing side surface 10, 11 to each surface of the second pair of opposing side surfaces 12,13. Both the first axial relief face 30 and the first axial abutment face 32 are adjacent to a first corner surface 71 and preferably tangentially connected to the first corner surface 71. Both the second axial relief face 30' and the second axial abutment face 32' are adjacent to a second corner surface 72 and preferably tangentially connected to the second corner surface 72. The corner surfaces are adjacent to respective corner cutting edges—the first corner surface 71 is adjacent to the first corner cutting edge 26 and the second corner surface 72 is adjacent to the second corner cutting edge 26'. A third corner surface 73 is arranged diagonally opposite to the second corner surface 72, see e.g. FIGS. 1a and 1d. The third corner surface 73 is extending between and connecting the first side surface 12 of the second pair of opposing side surfaces 12, 13 and the second side surface 11 of the first pair of opposing side surfaces 10,11. A fourth corner surface 74 is arranged diagonally opposite to the first corner surface 71, i.e. the fourth corner surface is extending between and connecting the second side surface 13 of the second pair of opposing side surfaces 12, 13 and the second side surface 11 of the first pair of opposing side surfaces 10, 11. Both the first radial abutment face 61 and the second radial abutment face 62, are adjacent to the third corner surface 73 and the fourth corner surface 74. The first radial abutment face 61 and the second radial abutment face 62 are tangentially connected to the third corner surface 73 and the fourth corner surface 74. The third radial abutment face 63 and the fourth radial abutment face 64 are adjacent to the first corner surface 71 and the second corner surface 72 and tangentially connected to them.

A third axial relief face 30" is arranged adjacent to the third auxiliary cutting edge 38". Seen in the direction along the first axis A1 towards the second surface 13 of the second pair of opposing side surfaces 12, 13, the third axial relief face 30" and a third axial abutment face 32" form part of a third surface grouping 34" on the second side of the longitudinal plane LP. The first surface grouping 34 and the third surface grouping 34" meet in a partitioning line L. The partitioning line L extends from the first side 14 to the second side 16.

The partitioning line L extends along the first side surface 12 of the second pair of opposing side surfaces 12, 13 in the longitudinal plane LP and may be said to part the first side surface 12 in two halves. In a corresponding manner, a partitioning line extends along the second side surface 13 of the second pair of opposing side surfaces 12, 13, and may be said to part of the second side surface 13 in two halves.

The partitioning line L may form a distinct line, visible when looking at the cutting insert. That is, the first surface grouping 34 and the third surface grouping 34" may be substantially flat at the partitioning line L, and an angle difference between the first and third surface groupings 34, 34" is such that the partitioning line L forms a distinct line. Alternatively, the partitioning line L may extend e.g. along a rounded ridge forming part of and extending between the first and third surface groupings 34, 34".

In these embodiments, the partitioning line L is a straight line, see e.g. FIG. 1e. and the partitioning line L extends perpendicularly to the median plane MP, see e.g. FIG. 1f.

In these embodiments, seen in any section through the partitioning line L and in parallel with the median plane MP, the partitioning line L extends immediately adjacent to the first axial abutment face 32 and/or to the third axial abutment face 32". Thus, the partitioning line L is formed at an intersection between at least one of the first and third axial abutment faces 32, 32". The partitioning line L extends also immediately adjacent to an end part of the first axial relief face 30 and an end part of the third axial relief face 30".

Seen in the view along the first axis A1 the first axial abutment face 32 and the third axial abutment face 32" together continuously extend along the first side surface 12 of the second pair of opposing side surfaces 12, 13.

A first side surface 10 of the first pair of opposing side surfaces 10, 11 comprises a first radial relief face 50 arranged adjacent to the first main cutting edge 24, see e.g. FIGS. 1a-1c. The first radial relief face 50 is indicated with hatching in a first direction in FIG. 1a. Seen in a view along the centre axis C, i.e. in the view of FIG. 1g, at least part of the first radial relief face 50 extends outside of the first main cutting edge 24 at least along a part of the first main cutting edge 24 such that the first radial relief face 50 extends more outside the first main cutting edge 24 towards a second end 29 of the main cutting edge 24 than towards the first end 27 of the main cutting edge 24. Seen in the view along the centre axis C, the first main cutting edge 24 may also be angled from the first end 27 towards the longitudinal plane LP.

In a similar manner, the first side surface 10 of the first pair of opposing side surfaces 10, 11 comprises a second radial relief face 50' arranged adjacent to the second main cutting edge 24'. The second radial relief face 50' is indicated with hatching in a second direction in FIG. 1a. Again, seen in a view along the centre axis C, this time from the opposite direction, at least part of the second radial relief face 50' extends outside of the second main cutting edge 24' in the same manner as the first radial relief face 50 does in relation to the first main cutting edge 24.

In a similar manner, the second side surface 11 of the first pair of opposing side surfaces 10, 11 comprises a third radial relief face 50" arranged adjacent to the third main cutting edge 24", see e.g. FIG. 1d and FIG. 1g. The second side surface 11 of the first pair of opposing side surface 10, 11 comprises also a fourth radial relief face arranged adjacent to a fourth main cutting edge. The fourth main cutting edge is a part of the fourth cutting edge 23'.

The first radial abutment face 61 extends between the third radial relief face 50" and the second radial abutment face 62. There is a smoothly curved transition between the third radial relief face 50" and the first radial abutment face 61. In the same way, the second radial abutment face 62 extends between the fourth radial relief face and the first radial abutment face 61. There is a smoothly curved transition between the fourth radial relief face and the second radial abutment face 62. In the same way, the third radial abutment face 63 is adjacent to the first radial relief face 50 and extends between the first radial relief face 50 and the fourth radial abutment face 64. The fourth radial abutment face 64 is adjacent to the second radial relief face 50' and extends between the second radial relief face 50' and the third radial abutment face 63. There is a smooth curved transition between the first relief face 50 and the third radial abutment face 63.

Figure 2A:
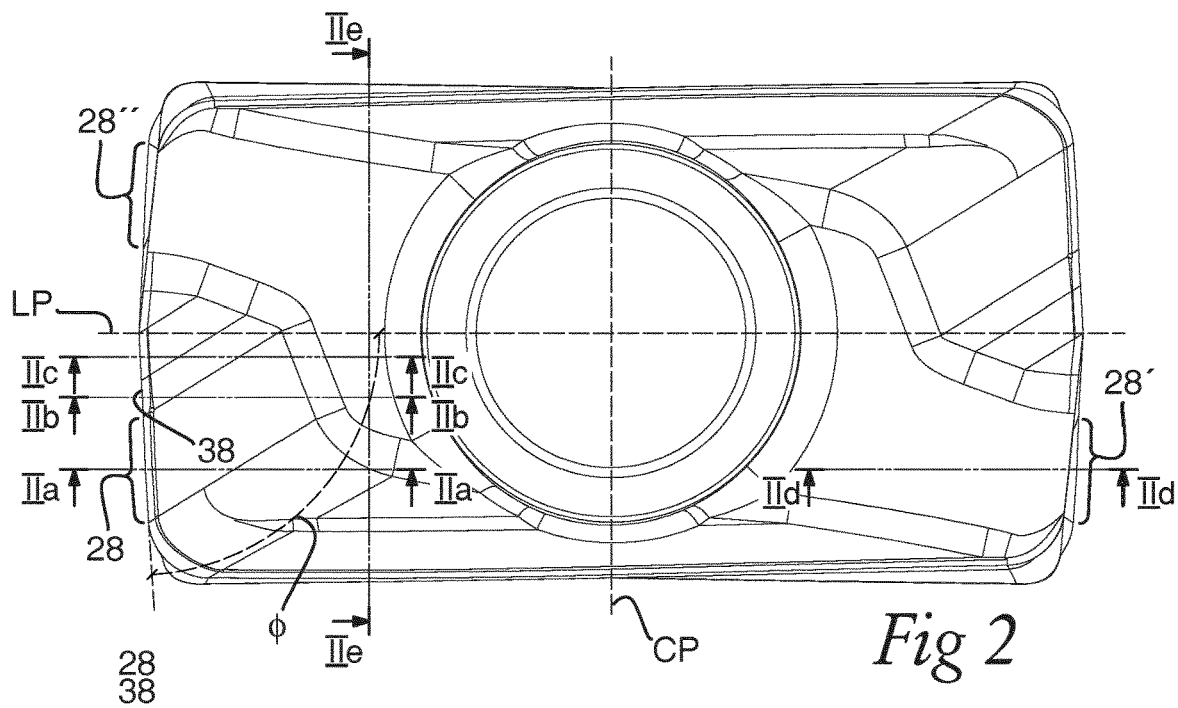
FIG. 2 shows a view of the cutting insert in FIGS. 1a-1g, FIGS. 2a-2e show cross sections extending along lines IIa-IIa, IIb-IIb, IIc-IIc, IId-IId and IIe-IIe, respectively, in FIG. 2.
Figure 2A:
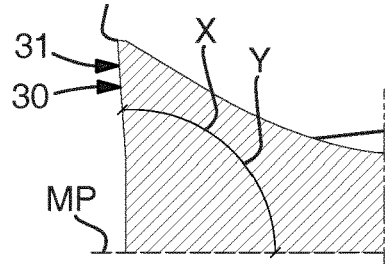
Figure 2B:
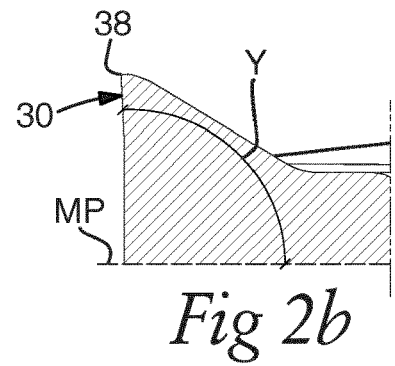

In the following, reference is made to FIGS. 1c and 2-2b. FIGS. 2a and 2b show cross sections extending in parallel with the longitudinal plane LP along lines IIa-IIa and IIb-IIb, respectively, in FIG. 2. Seen in a plane parallel with the longitudinal plane LP, such as in each of the views of FIGS. 2a and 2b, the first axial relief face 30 extends from the first surface-wiping cutting secondary edge 28 at a first obtuse inner angle X to the median plane MP. In a corresponding manner, a first part 31' of the second axial relief face 30' forms a second obtuse inner angle X' with the median plane MP when seen in a section parallel to the longitudinal plane LP, see FIG. 2d, which shows a cross section along line IId-IId in FIG. 2. In this manner, a positive axial relief angle is provided in the cutting insert 2 at the first and second surface-wiping secondary cutting edge 28, 28'.

The first inner angle X and the second inner angle X' may be within a range of 91-115 degrees, preferably within a range of 94-110 degrees, or approximately at 97 degrees. Thus, in relation to a normal of the median plane MP, a positive relief angle in a range of 1-25 degrees, preferably within a range of 4-20 degrees may be provided. The first inner angle X and the second inner angle X' are preferably but not necessarily equal to each other along the first and second surface-wiping secondary cutting edges 28, 28'. The value of the first inner angle X may vary along the first surface-wiping secondary cutting edges 28. The same applies to the second inner angle X'.

Figure 2C:
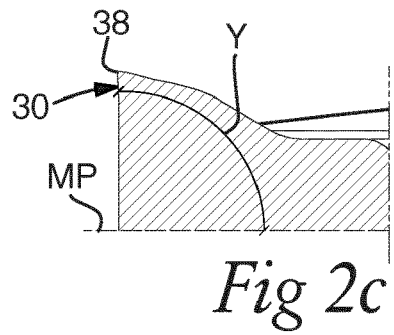
Figure 2D:
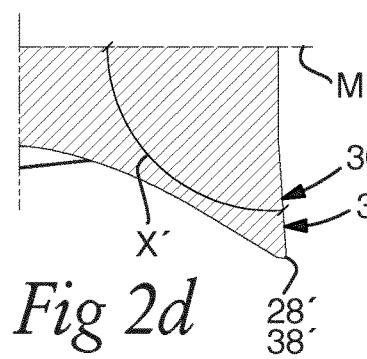
Figure 2E:
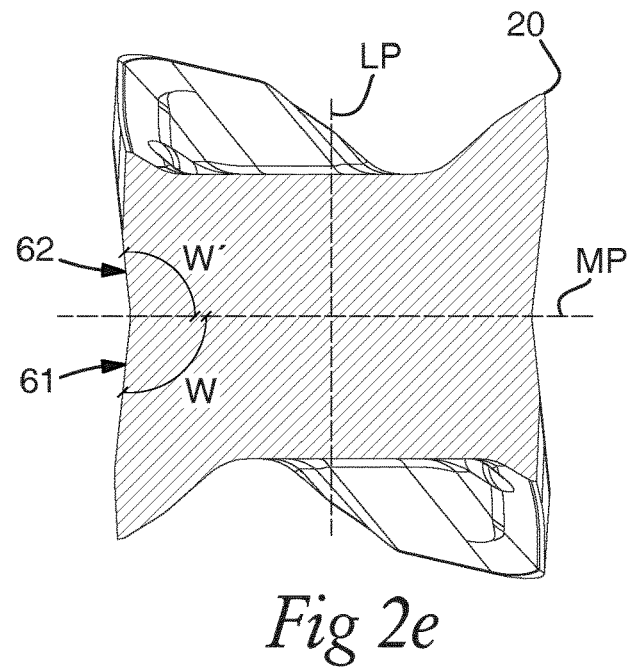

Seen in a plane parallel with the central plane CP, such as in the view of FIG. 2e, which shows a cross section along line IIe-IIe in FIG. 2, the first radial abutment face 61 forms an obtuse third inner angle W to the median plane MP. When seen in the same plane, the second radial abutment face 62 forms an obtuse fourth inner angle W' to the median plane. The obtuse third inner angle W and the fourth obtuse inner angle W' may be within a range of 91-120 degrees, or within a range of 92-105 degrees or within a range of 94-100 degrees. The obtuse third inner angle W and the fourth obtuse inner angle W' are preferably but not necessarily equal to each other along the first and second radial abutment faces 61, 62. The first radial abutment face 61 and the second radial abutment face 62 are preferably but not necessarily flat surfaces.

Figure 3:
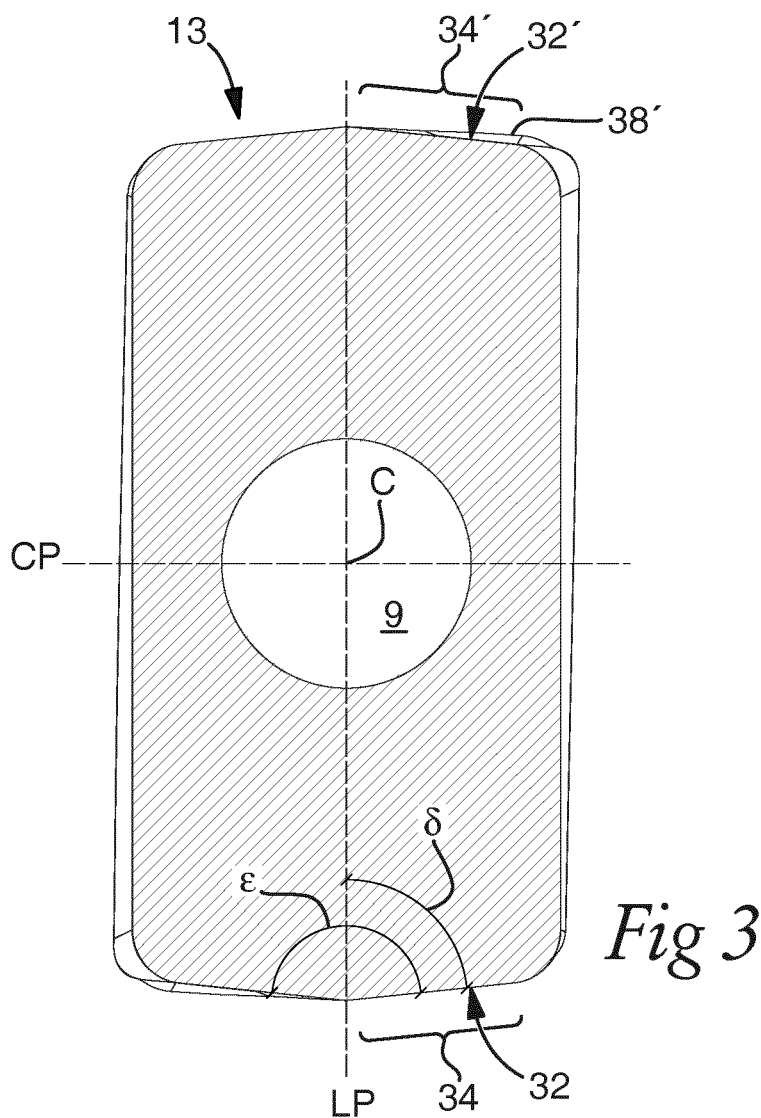
FIG. 3 shows a cross section of the cutting insert according to the first embodiment.

FIG. 3 shows a cross section of the cutting insert 2 of FIGS. 1a-1g. The cross section of FIG. 3 extends in the plane of the median plane MP. Measured in a direction in parallel with the longitudinal plane LP, in a section of the median plane MP through the cutting insert 2, i.e. in the view of FIG. 3, the cutting insert 2 is longest along the longitudinal plane LP. Seen in a direction along the second axis A2, i.e. perpendicularly to the longitudinal plane LP and toward the first side surface 10 of the first pair of opposing side surfaces 10, 11, as shown in FIG. 1g, each point of the first and second surface groupings 34, 34' has a unique projection point on the longitudinal plane LP. This means that each of the first and second surface groupings 34, 34' is arranged such that each point of the first and second surface groupings 34, 34' is visible in the view along the second axis A2. In a similar manner, in a view along the second axis A2 in an opposite direction, each point of the third surface grouping 34", as well as a corresponding fourth surface grouping at the fourth cutting edge 23', has a unique projection point on the longitudinal plane LP. This means that the third surface grouping 34" is arranged such that each point of the third surface grouping 34" is visible in the view along the second axis A2 and toward the second side surface 11 of the first pair of opposing side surfaces 10, 11. The same applies to the fourth surface grouping.

Thus, the cutting insert 2 is formable by MAP with a split line of a relevant pressing tool at the longitudinal plane LP. The first and second surface groupings 34, 34' may be formed in the MAP operation. Being able to position a split line of a pressing tool at the longitudinal plane LP entails that the pressing tool is uncomplex and thus, easily produced. Moreover, the split line is positioned in an area where any burrs in the insert 2 from the MAP operation will not affect the use of the cutting insert 2 to any substantial extent. In particular, burrs at the longitudinal plane LP will not affect the axial position of the cutting insert 2 when positioned in an insert seat of a milling tool.

When manufacturing a cutting insert utilising a conventional pressing process, a powder compound is pressed between two vertical stamps into a recess of a die to form a green body, which after sintering forms a cutting insert. In MAP the powder compound in question is pressed not only between two stamps forming the first side 14 and the second side 16 of the green body to be manufactured, but also between two additional stamps, which form the circumferential surface 18.

By shaping the cutting insert 2 in the manner described herein, i.e. seen in the direction along the second axis A2, with each point of the first surface grouping 34 having a unique projection point on the longitudinal plane LP, and with each point of the second surface grouping 34' having a unique projection point on the longitudinal plane LP, the two stamps forming the circumferential surface 18 can be retracted in a linear path of motion from the finish-pressed green body in such a way that each point on the stamp surfaces immediately clears from the green body without scraping any surface of the same. In other words, the design of the cutting insert 2 guarantees a good surface quality, something that in turn allows manufacture of directly pressed, non-ground cutting inserts having good dimensional accuracy. Thus, the cutting insert 2 may obtain its final shape directly after pressing and sintering, and without needing to be after-treated by grinding or the like. Naturally, one or more surfaces or edges of the cutting insert 2 may be ground after sintering to meet certain tolerances or demands of edge sharpness.

In the median plane MP an obtuse seventh inner angle $\varepsilon$ may be formed between the first surface grouping 34 and the third surface grouping 34". Furthermore, in any plane parallel to the median plane MP and through both the first and third surface grouping 34, 34", the obtuse seventh inner angle $\varepsilon$ may be formed between the first and third surface grouping 34, 34". The seventh inner angle $\varepsilon$ need not be the same in each plane. Accordingly, the inner angle $\varepsilon$ may vary between one or more of the median plane MP and the planes in parallel with the median plane.

The obtuse seventh inner angle $\varepsilon$ may be within a range of 150-178 degrees, preferably within a range of 164-172 degrees. Mentioned purely as an example, the obtuse seventh inner angle $\varepsilon$ may be approximately 168 degrees in the median plane MP.

With reference to FIG. 3, seen in the view along the centre axis C, the first axial abutment face 32 forms a fifth inner angle $\delta$ with the longitudinal plane LP within a range of 75-88 degrees.

With reference to FIG. 2, seen in the view along the centre axis C, the first surface-wiping secondary cutting edge 28, or a tangent of the first surface-wiping secondary cutting edge extends at a sixth inner angle $\phi$ to the longitudinal plane LP, which sixth inner angle $\phi$ is ≤89 degrees, wherein the sixth inner angle $\phi$ is preferably larger than the fifth inner angle $\delta$. In this manner, the first surface-wiping secondary cutting edge will extend beyond the first axial abutment face, seen in the view along the centre axis C. Thus, the cutting insert may be arranged in an insert seat of a milling tool with no, or only a small, axial rake angle of the median plane with the first surface-wiping secondary cutting edge protruding sufficiently from the first axial abutment face for cutting engagement with a workpiece. The sixth inner angle $\phi$ can also be equal to the fifth inner angle $\delta$.

Referring e.g. to FIGS. 1a and 1b, the first axial abutment face 32 forms a substantially flat surface. Similarly, the second axial abutment face 32' forms a substantially flat surface. Thus, the first and second axial abutment faces 32, 32' are particularly suited for abutting, one at a time, against an axial support surface in an insert seat of a milling tool. The first axial abutment face 32 extends perpendicularly to the median plane MP. Similarly, the second axial abutment face 32' extends perpendicularly to the median plane MP. An exact axial positioning of the cutting insert in an insert seat of a square shoulder milling tool thus, may be achieved. As discussed above, and below with reference to the milling tool, a deviation from a target thickness of the cutting insert will affect axial runout of the cutting insert at least only to a limited extent, and in some cases not at all.

Referring e.g. to FIG. 3, seen in a view along the centre axis C on the first side of the longitudinal plane LP, for part of the cutting insert 2 which is between the median plane MP and the second side 16, the first axial abutment face 32 forms a surface of the first surface grouping 34 which is the most distant surface of the cutting insert 2 from the centre axis C. Thus, no recesses or protrusions are provided in the first surface grouping 34 between the median plane MP and the second side 16.

In a similar manner, seen in the view along the centre axis C on the second side surface 13 of the second pair of opposing side surfaces 12, 13, again on the first side of the longitudinal plane LP, for part of the cutting insert 2 between the median plane MP and the first side 14, the second axial abutment face 32' forms a surface of the second surface grouping 34' which is the most distant surface of the cutting insert 2 from the centre axis C.

The first axial abutment face 32 may form a substantially flat surface extending from the median plane MP towards the second side 16. The second axial abutment face 32' forms a substantially flat surface extending from the median plane MP towards the first side 14.

The first axial abutment face 32 may form a substantially flat surface extending from the median plane MP to the second side 16. The second axial abutment face 32' forms a substantially flat surface extending from the median plane MP to the first side 14.

Seen in the direction along the first axis A1 and projected on the central plane CP the first axial abutment face 32 may form at least 30% of the first surface grouping 34. Similarly, seen in an opposite direction along the first axis A1 and projected on the central plane CP, the second axial abutment face 32' may form at least 30% of the second surface grouping 34'.

The discussion above of the different aspects of the first and second axial abutment face 32, 32' may also relate to corresponding axial abutment faces on the second side of the longitudinal plane LP.

The first axial relief face 30 comprises a first part 31 of the first axial relief face 30 adjacent to the first surface-wiping secondary cutting edge 28, see FIG. 1c.

Figure 4:
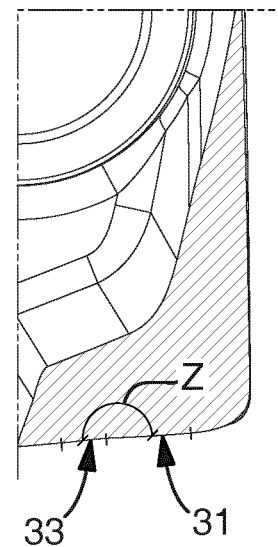
FIG. 4 shows a cross section along line IV-IV in FIG. 1e.

In the following reference is made to FIGS. 1c and 1d, and to the cross section along line IV-IV in FIG. 1e shown in FIG. 4. The cross section IV-IV extends in a direction in parallel with the median plane MP. The first auxiliary cutting edge 38 comprise at least a second cutting edge part 39. The second cutting edge part 39 is arranged closer to the longitudinal plane LP than the first surface-wiping secondary cutting edge 28. The first axial relief face 30 comprises at least a second part 33. The second part 33 is arranged adjacent to the second cutting edge part 39 of the first auxiliary cutting edge 38, see e.g. FIG. 1d. The second part 33 of the first axial relief face 30 create an obtuse tenth inner angle Z with the first part 31 of the first axial relief face 30. In this manner, the first and second parts of the first axial relief face do not extend in one and the same plane. Thus, when the insert is mounted in the insert seat, the second cutting edge part of the first auxiliary cutting edge can be positioned furthest out in the longitudinal direction and separated from the work-piece surface created by the first surface-wiping secondary cutting edge, without a big and abrupt change of the direction of the first auxiliary cutting edge (seen in a view along the first axis) in the transition between the first surface-wiping secondary cutting edge and the second cutting edge part of the first auxiliary cutting edge. Thanks to this, during manufacturing of the cutting insert, the part of the pressing tool which creates the first side (and/or the part of the pressing tool which creates the second side) is not subject to high stress concentrations in the area of the transition between the first surface-wiping secondary cutting edge and the second cutting edge part of the first auxiliary cutting edge. The second part 33 of the first axial relief face 30 can be at least partly flat but it can be also partly curved or entirely curved surface.

In a similar manner, the second auxiliary cutting edge 38' comprises a second cutting edge part and an obtuse inner angle is created between a first part and a second part of the second axial relief face 30'. The second part of the second axial relief face 30' can be at least partly flat but it can be also partly curved or entirely curved surface.

In the following reference is made to FIGS. 2-2c. FIGS. 2a-2c show cross sections extending in parallel with the longitudinal plane LP along lines a-a, b-b, and c-c, respectively, in FIG. 2.

When seen in different sections in parallel with the longitudinal plane LP, such as exemplified by the cross sections of FIGS. 2a-2c, and through the first auxiliary cutting edge 38, the first axial relief face 30 forms an eleventh inner angle Y in relation to the median plane MP. The eleventh inner angle Y is measured adjacent to the first auxiliary cutting edge 38. The eleventh inner angle Y differs for at least some of the different sections in parallel with the longitudinal plane LP. This applies also for the corresponding inner angle measured adjacent to the second auxiliary cutting edge 38'.

The eleventh inner angle Y, at an end of the first axial relief face 30 close to the longitudinal plane LP, may be equal to or substantially equal to an inner angle of the partitioning line L to the median plane MP. Thus, in embodiments wherein the partitioning line L extends perpendicularly to the median plane MP, the eleventh inner angle Y will transition from an obtuse inner angle farther way from the longitudinal plane LP to a perpendicular inner angle, or substantially perpendicular inner angle, close to the longitudinal plane LP. This applies also for the corresponding inner angle measured adjacent to the second auxiliary cutting edge 38'.

Along the first surface-wiping secondary cutting edge 28 of the first auxiliary cutting edge 38 the first inner angle X and the eleventh inner angle Y coincide with each other. This applies also for and along the second surface-wiping secondary cutting edge 28'.

With reference to FIGS. 1c and 1e, seen in the view along the first axis A1 towards the first side surface 12 of the second pair of opposing side surfaces 12, 13, at least part of the first axial abutment face 32 is arranged between the second side 16 and at least a part of the first surface-wiping secondary cutting edge 28 or at least a major part of the surface-wiping secondary cutting edge 28. In the same way, at least a part of the second axial abutment face 32' is arranged between the first side 14 and at least a part of the second surface-wiping secondary cutting edge 28' or at least a major part of the second surface-wiping secondary cutting edge 28'. When the first axial abutment face 32 abuts against an axial support surface in an insert seat of a milling tool, the second cutting edge 23, and its second surface-wiping secondary cutting edge 28' is active, i.e. arranged for cutting engagement with a workpiece. With the above-mentioned arrangement of the first axial abutment face 32 in relation to the first surface-wiping secondary cutting edge 28, an axial support of the cutting insert 2 is provided along an axial direction from the second surface-wiping secondary cutting edge 28'. Thus, a low error axial error positioning of the cutting insert in the insert seat of the milling tool may be provided.

Seen in the view along the first axis A1 towards the first side surface 12 of the second pair of opposing side surfaces 12, 13, the first axial relief face 30 has a height h in a direction parallel with the longitudinal plane LP and projected on the central plane CP, see FIG. 1e. The height h increases in a direction away from the longitudinal plane LP towards the first corner cutting edge 26. In this manner, the first axial relief face 30 has its largest height h in the vicinity of the first corner cutting edge 26, where normally the risk of fractures is the largest due to high loads at the corner cutting edge. The large height h towards the corner cutting edge 26 means stress concentration in a transition from the axial relief face 30 to the axial support surface 32 is formed at a distance from the corner cutting edge 26. At the same time, the smaller height h towards the longitudinal plane makes it easier to obtain a simplified partitioning line L which in its turn simplifies the pressing tool.

Seen in the view along the first axis A1 towards the first side surface 12 of the second pair of opposing side surfaces 12, 13, the first axial relief face 30 is adjacent to the first corner surface 71 and preferably tangentially connected to the first corner surface 71, see FIG. 1a. Also, the third axial relief face 30" is adjacent to the third corner surface 73 and preferably tangentially connected to the third corner surface 73. The first axial relief face 30 is arranged such that a distance from the median plane MP to the first axial relief face increases in a direction away from the first corner face 71 toward the longitudinal plane LP. Thanks to this, the first axial abutment face 32 can be enlarged which gives possibility to improved stability of the insert but which also simplifies the area around the partitioning line L where the first surface grouping 34 meets the third surface grouping 34" which in its turn contributes to improved tolerances of the insert. Also, the third axial relief face 30" is arranged such that a distance from the median plane MP to the third axial relief face increases in a direction away from the third corner surface 73 toward the longitudinal plane. Thanks to this, the third axial abutment face 32" can be enlarged which gives possibility to improved stability of the insert but which also simplifies the area around the partitioning line L where the first surface grouping 34 meets the third surface grouping 34" which in its turn contributes to improved tolerances of the insert. In the same manner, the second axial relief face 30', see FIG. 1b, is arranged such that a distance from the median plane MP to the second axial relief face 30' increases in a direction away from the adjacent second corner face 72 toward the longitudinal plane.

The first and second radial relief face 50, 50' are adjacent to the first and second corner surface 71, 72 and preferably tangentially connected to the first and second corner surface 71, 72, see FIG. 1a.

With reference to FIG. 1e, seen in the view along the first axis A1, the first surface-wiping secondary cutting edge 28, or a tangent to the first surface-wiping secondary cutting edge in the midpoint of the first surface-wiping secondary cutting edge, extends at a twelfth sharp angle A to the median plane MP, such that a first end of the first surface-wiping secondary cutting edge 28 adjacent to the first corner cutting edge 26 is situated at a greater distance from the median plane MP than the opposite end of the first surface-wiping secondary cutting edge 28 adjacent to the second cutting edge part 39 of the first auxiliary cutting edge 38. The twelfth angle A is greater than 0 degrees, or preferably $15° \leq \lambda \leq 25°$.

Figure 5A:
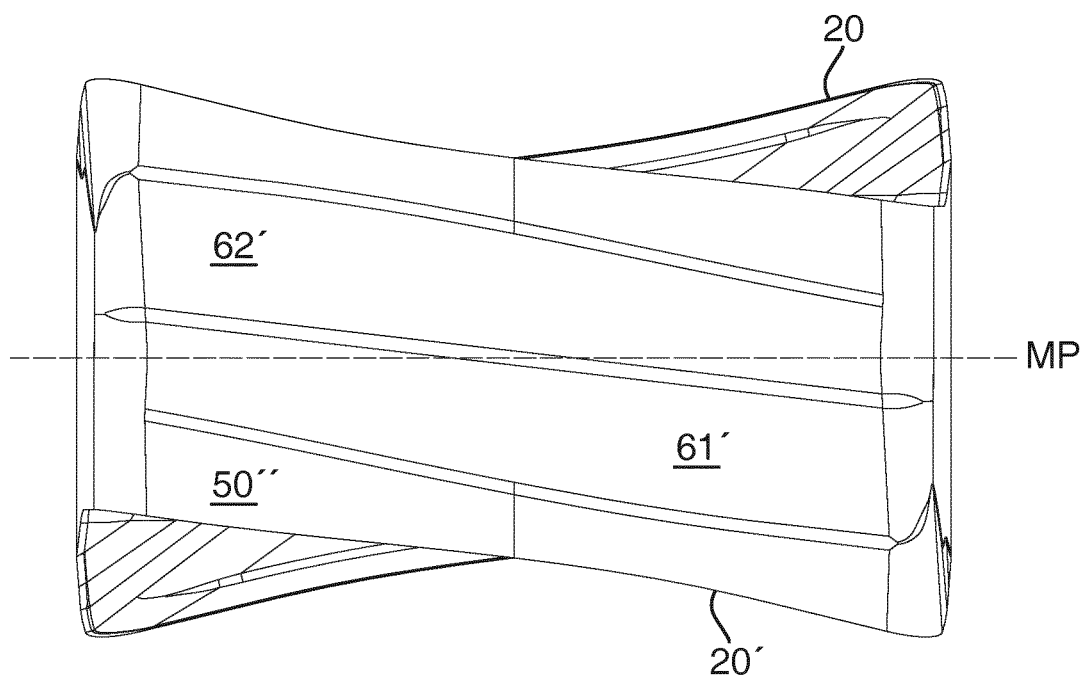
FIGS. 5a-5b shows side views of a cutting insert according to a second embodiment.
Figure 5B:
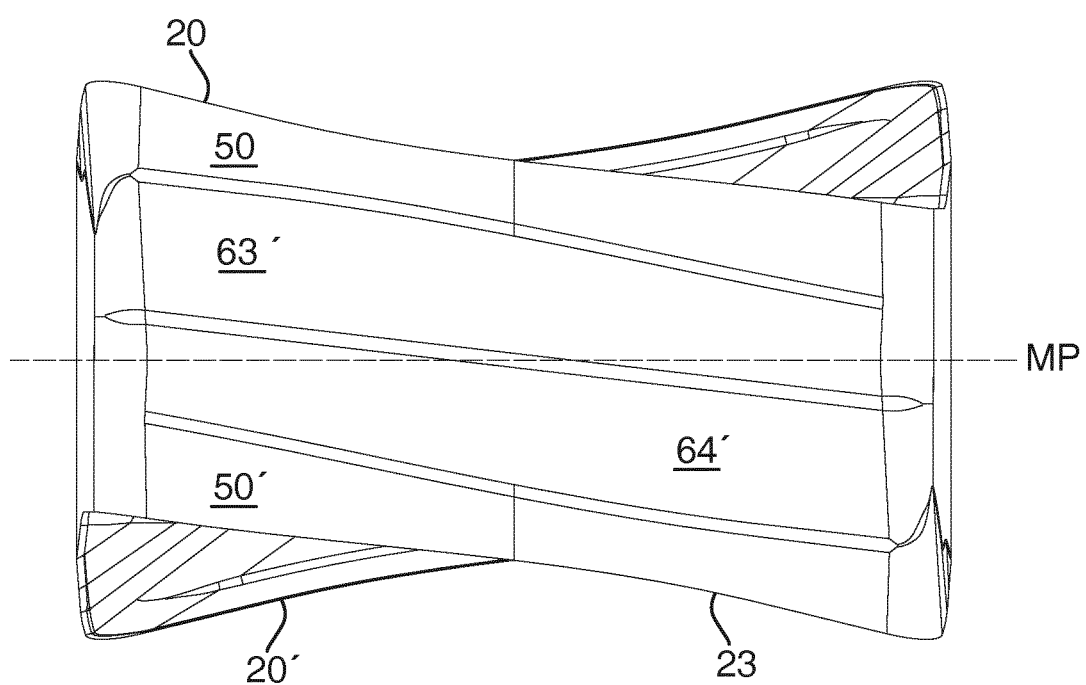

FIGS. 5a and 5b illustrate side views of the cutting insert 2 according to a second embodiment. FIGS. 5a and 5b are views towards the second side surface 11 and the first side surface 10 respectively of the first pair of opposing side surfaces 10, 11. The second embodiment of the cutting insert differs from the above described embodiments in that the first radial abutment face 61' is arranged on both sides of the median plane MP and in that the second radial abutment face 62' is arranged on both sides of the median plane MP, see FIG. 5a. The second embodiment of the cutting insert differs also from the above described embodiments in that the third radial abutment face 63' is arranged on both sides of the median plane MP and in that the fourth radial abutment face 64' is arranged on both sides of the median plane MP. All other features of the cutting insert according to the second embodiment may be the same as the features of the cutting insert according to the first embodiment and/or the features of the cutting insert according to the earlier described embodiments.

FIGS. 6a-6d illustrate different views of a milling tool 40 according to embodiments. The milling tool 40 is a square shoulder milling tool. The milling tool 40 is configured to be rotated about a rotation axis 42. The milling tool comprises a tool body 44. The tool body 44 at a first axial end portion 45 thereof is provided with an insert seat 46 for receiving a cutting insert 2. In these embodiments the tool body 44 is provided with six insert seats 46. According to alternative embodiments, inter alia depending on a diameter of the tool body, the tool body may be provided with less or more than six insert seats. A smaller diameter tool body may for instance be provided with two insert seats. Whereas a larger diameter tool body may be provided with ten, twelve, or more insert seats. At a second axial end portion, opposite to the first axial end portion 45, the tool body 44 is configured for mounting the tool body 44 to e.g. a rotating spindle of a machine via e.g. a tool holder (not shown).

The milling tool 40 is configured to comprises a cutting insert 2 according to any one of aspects and/or embodiments discussed herein arranged in each of the insert seats 46. For the sake of clarity, cutting inserts have been omitted in some of the insert seats 46 in FIGS. 6a and 6b. In these embodiments, the cutting insert 2 is secured to the tool body 44 with a screw 47 extending through the through hole 9 of the cutting insert 2 and co-operating with a threaded hole in the insert seat.

Each of the insert seats 46 is provided with a tangential support surface 52, a first radial support surface 54, and an axial support surface 56. The axial support surface 56 extends perpendicularly or substantially perpendicularly to the tangential support surface 52. Each of the insert seats 46 may optionally be provided with a second radial support surface 54'.

When positioned in the insert seat 46, the cutting insert 2 and the insert seat 46 are arranged such that a portion of the first or second side 14, 16 of the cutting insert 2 is abutting against the tangential support surface 52, a portion of the first or second side surface 10, 11 of the first pair of opposing side surfaces 10, 11 abutting against the first radial support surface 54, and a portion of the first or second side surface 12, 13 of the second pair of opposing side surfaces 12, 13 is abutting against the axial support surface 56.

Figure 6A:
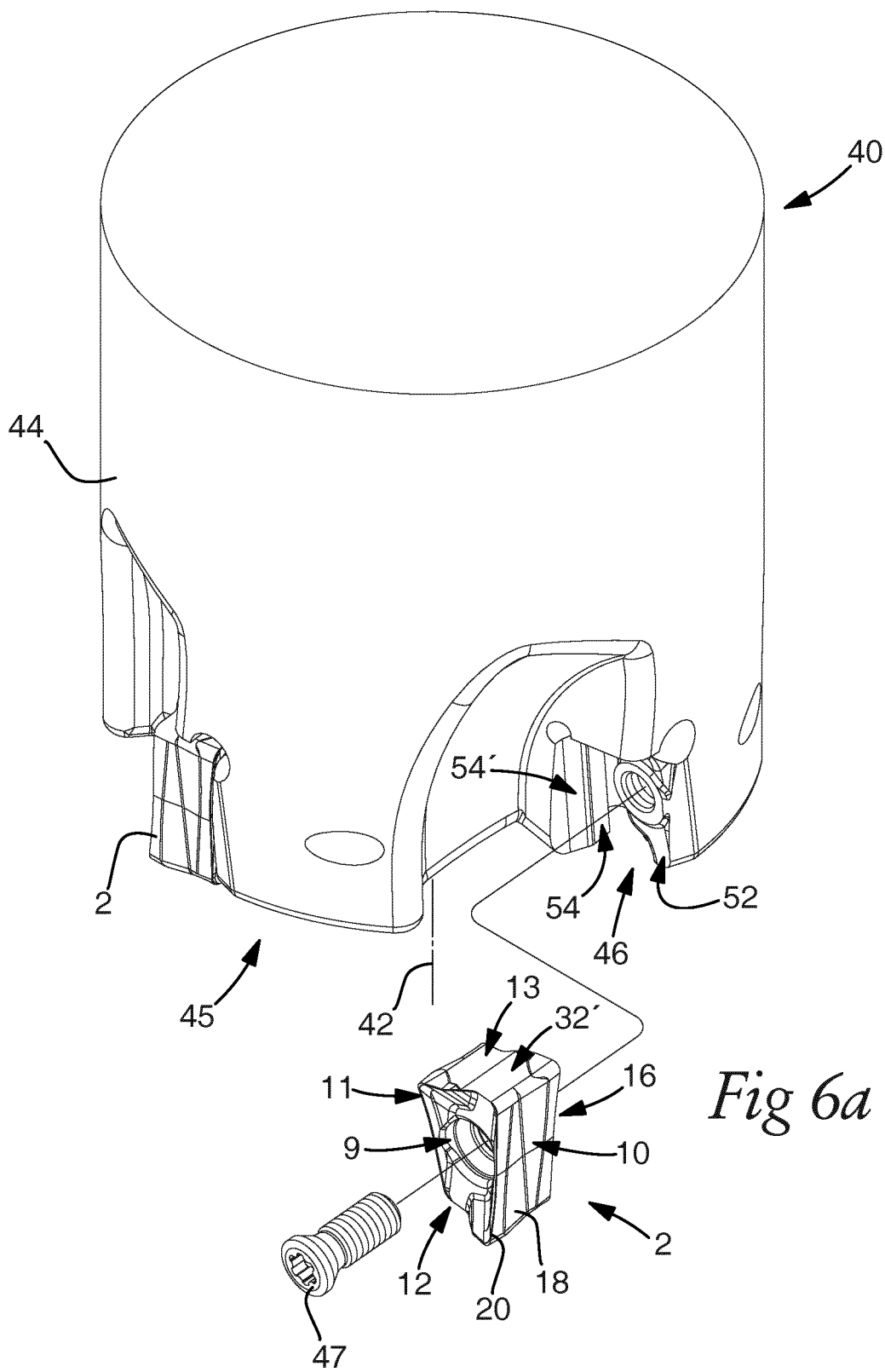
FIGS. 6a-6d illustrate different views of a milling tool according to an embodiment.
Figure 6B:
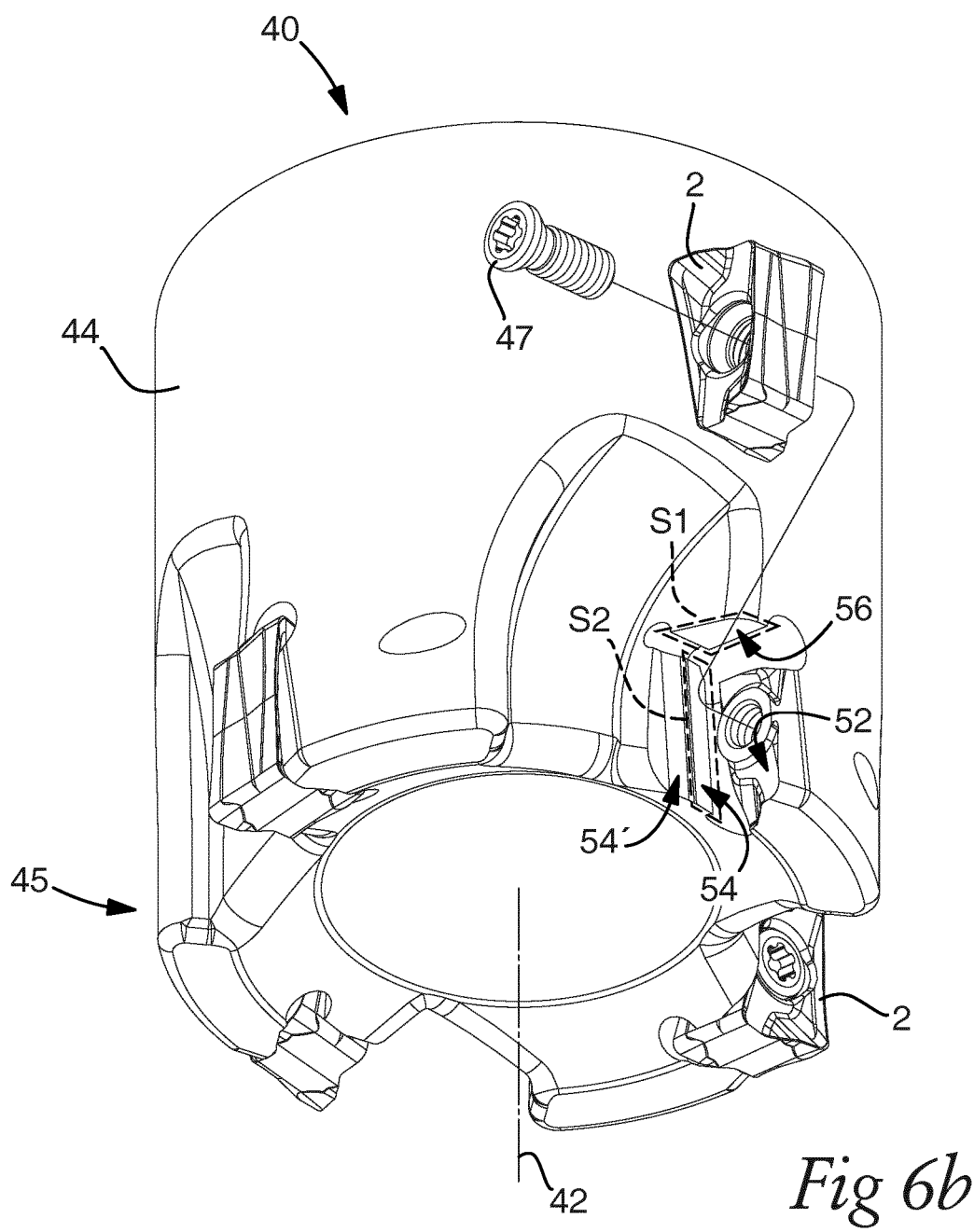

When the first cutting edge 20 is positioned for cutting engagement with a workpiece in the insert seat 46, as indicated in FIG. 6a, the second side 16 abuts against the tangential support 52, the first radial abutment face 61 abuts against the first radial support surface 54, and the second axial abutment face 32' at the second side surface 13 of the second pair of opposing side surfaces 12, 13 abuts against the axial support surface 56 in the insert seat 46. The axial support surface 56 need not abut against the entire second axial abutment face 32' of the cutting insert 2.

The axial support surface 56 extends in a first support plane S1. The first support plane S1 crosses the rotation axis 42 on a side of the insert seat 46 opposite to the first axial end portion 45. Thus, the axial support surface 56 leans towards the first axial end portion 45 towards a radially outer portion of the insert seat 46. This entails that an axial force applied to the cutting insert 2 during a milling operation provides a radial force component at the axial support surface 56 pushing the cutting insert 2 radially inwardly into the insert seat 46.

As discussed above, the arrangement of e.g. the first axial abutment face 32 at the first side surface 12 of the second pair of opposing side surfaces 12, 13 between the second side 16 and at least a part of the first surface-wiping secondary cutting edge 28 provides for an axial support of the cutting insert 2 along an axial direction from the second surface-wiping secondary cutting edge 28' to the axial support surface 56 (when the second cutting edge 23 is positioned for cutting engagement with a workpiece). The axial support is provided far outwardly in a radial direction due to the axial abutment face 32 being provided axial opposite to the surface-wiping secondary cutting edge. Thus, a stable positioning of the cutting insert 2 in the insert seat may be provided.

The first radial support surface 54 extends in a second support plane S2, wherein the second support plane S2 crosses the rotation axis 42 on a same side of the insert seat 46 as the first axial end portion 45. Thus, the first radial support surface 54 leans towards the rotation axis 42 at an axially outer end of the insert seat 46.

Namely, as discussed above, seen in the view along the centre axis C, at least part of the first radial relief face 50 extends outside of the first main cutting edge 24 at least along a part of the first main cutting edge 24, preferably such that the first radial relief face 50 extends more outside the first main cutting edge 24 towards a second end 29 of the main cutting edge 24 than towards the first end 27 of the main cutting edge 24. Thus, the first main cutting edge 24 of the cutting insert 2 is positioned to extend on the wall of an imaginary cylinder or substantially on the wall of that cylinder having same centre axis as the rotation axis 42 of the milling tool 40.

Figure 6C:
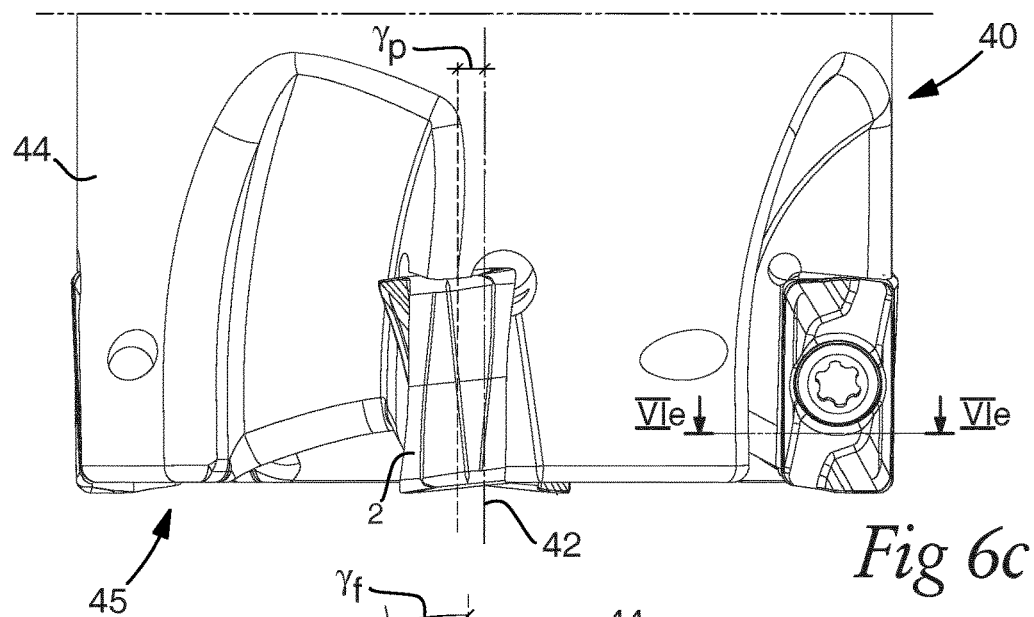

The insert seat 46 is configured to provide an axial rake angle γp for the median plane MP of the cutting insert 2 arranged in the insert seat 46, see FIG. 6c. The insert seat 46 is configured to provide an axial rake angle γp equal to 0 degrees or a negative axial rake angle γp having an absolute value within a range of 0<|γp|≤3 degrees, or within a range of 0.5≤|γp|≤2 degrees, or of approximately 1 degree.

Thus, the cutting insert 2 is only marginally tilted in an axial direction of the milling tool 40. Thus, a deviation from a target thickness of the cutting insert 2, i.e. in a direction along the centre axis C of the cutting insert 2, will not affect axial runout of the cutting insert 2, or at least will affect axial throw/runout only to a limited extent.

Figure 6D:
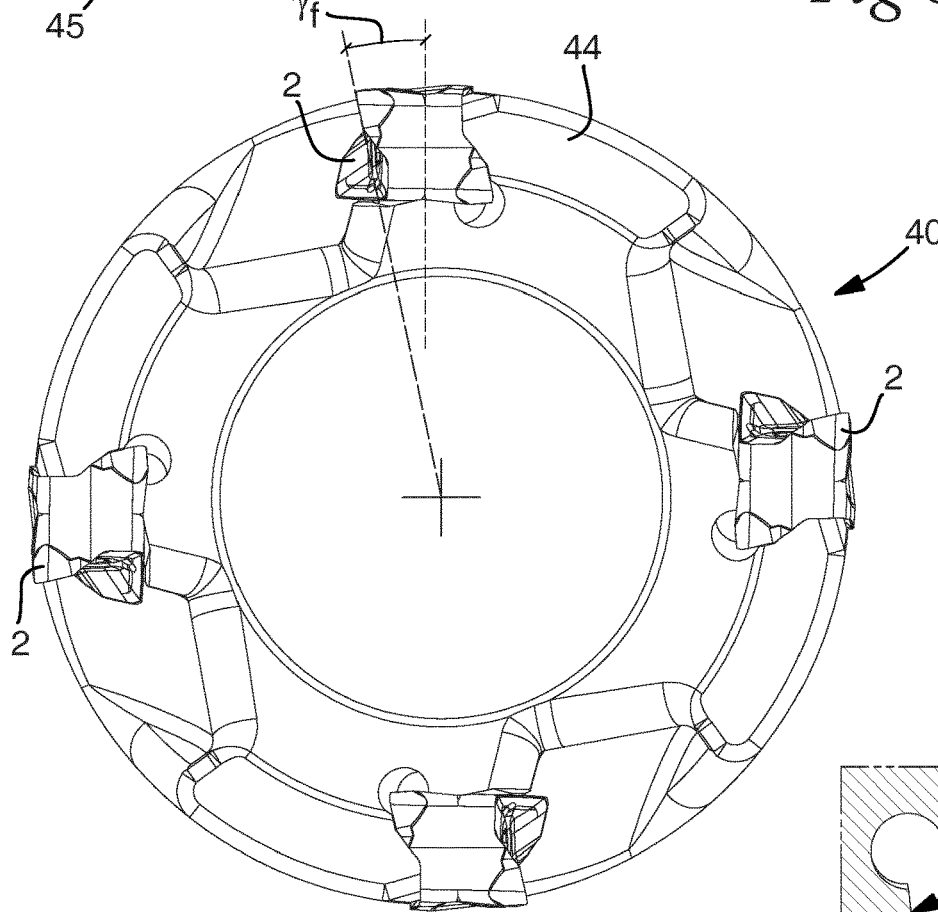

The insert seat 46 is configured to provide a negative radial rake angle γf for the median plane MP of the cutting insert 2 arranged in the insert seat 46, see FIG. 6d. The insert seat 46 is configured to provide a negative radial rake angle γf having an absolute value within a range of 10≤|γf|≤30 degrees, or within a range of 15≤|γf|≤25 degrees. In this manner, a functional positive relief angle of the main cutting edge of the first cutting edge 20 may be formed by the radial rake angle γf.

Namely, as discussed above, seen in the view along the centre axis C, at least part of the first radial relief face 50 extends outside of the first main cutting edge 24 at least along a part of the first main cutting edge. Thus, the radial rake angle γf provides for a positive functional rake angle when the cutting insert 2 is positioned in the insert seat 46.

Figure 6E:
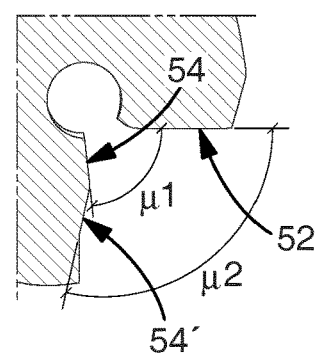
FIG. 6e shows a cross section along line VIe-VIe in FIG. 6c, through an insert seat and in parallel with a central plane of the cutting insert, when the cutting insert is mounted in the insert seat.

FIG. 6e shows a cross section along line VIe-VIe in FIG. 6c, through the insert seat 46 and in parallel with the central plane CP of the cutting insert 2, when the cutting insert 2 is mounted in the insert seat 46. For simplicity reasons, the cutting insert is omitted in FIG. 6e. The first radial support surface 54 extends at a sharp eight angle μ1 to the tangential support surface 52, as indicated in FIG. 6e. The sum of the sharp eight angle μ1 and the obtuse third inner angle W is in the range of 179-181 degrees, or within the range of 179.5-180.5 degrees or 180 degrees.

The insert seat 46 may be arranged with the second radial support surface 54'. The second radial support surface 54' may extend at an obtuse ninth angle to the tangential support surface 52, when seen in a section through the insert seat 46 and in parallel with the central plane CP when the cutting insert 2 is mounted in the insert seat 46, as indicated in FIG. 6e. The obtuse ninth angle μ2 may be such that an absolute value of a difference between the obtuse ninth angle μ2 and the obtuse fourth inner angle W', is |μ2−W'|≤1°, or |μ2−W'|≤0.5°, or |μ2−W'|=0°. The insert seat 46 and the cutting insert 2 may be arranged such that the second radial abutment face 62 abuts against the second radial support surface 54' at the same time as the first radial abutment face 61 abuts against the first radial support surface 54, when the first cutting edge 20 is in operable position.

The milling tool 40 illustrated in FIGS. 6a-6e, has the first radial support surface 54 arranged only on one side of the median plane MP, when the cutting insert is mounted in the insert seat.

When the cutting insert 2 is mounted in the insert seat of the milling tool 40 illustrated in FIGS. 6a-6e, the first radial support surface 54 extends only on one side of the median plane MP, namely between the median plane MP and the tangential support surface 52. Thus, the insert seat 46 is adapted for reception of the cutting insert illustrated in FIGS. 1-4. However, the cutting insert illustrated in FIGS. 5a and 5b may also be mounted in the insert seat 46 of the milling tool 40 illustrated in FIGS. 6a-6e.

In a further one embodiment of the milling tool (not shown in the drawings), the insert seat may be arranged with a first radial support surface that extends on both sides of the median plane MP, when the cutting insert illustrated in FIGS. 5a and 5b is mounted in the insert seat. The first radial support surface is furthermore arranged such that the first radial abutment face 61' abuts the first radial support surface on both sides of the median plane MP when the cutting insert illustrated in FIGS. 5a and 5b is mounted in the insert seat and the first cutting edge 20 is in operable position. Such an insert seat may also be arranged with a second radial support surface arranged such that the second radial abutment face 62' abuts the second radial support surface at the same time as the first radial abutment face 61' abuts the first radial support surface when the cutting insert illustrated in FIGS. 5a and 5b is mounted in the insert seat and the first cutting edge is in operable position. The second radial support surface may also be arranged such that it extends on both sides of the median plane MP and such that the second radial abutment face 62' abuts the second radial support surface on both sides of the median plane MP when the cutting insert illustrated in FIGS. 5a and 5b is mounted in the insert seat and the first cutting edge 20 is in operable position. This milling tool and this insert seat may have all other mentioned features of the milling tool 40 and the insert seat 46 illustrated in FIGS. 6a-6e.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention is not limited to a square shoulder milling insert and a square shoulder tool, and it can be applied also on other types of double-sided inserts and other types of milling tools, such as high-feed cutting inserts and high-feed milling tools. However, the invention is especially beneficial when applied to square shoulder inserts and tools because of requirements related to surface quality of the machined surface and 90° wall.

The invention claimed is:

1. A cutting insert for a milling tool the cutting insert comprising:
   a first side defining a first extension plane;
   a second side opposite to the first side defining a second extension plane, wherein the first and second extension planes extend in parallel, and wherein a center axis extends perpendicularly through the first and second extension planes;
   a circumferential surface extending between the first side and the second side, the circumferential surface including a first pair of opposing side surfaces and a second pair of opposing side surfaces;
   a median plane extending halfway between the first extension plane and the second extension plane;
   a longitudinal plane extending halfway between the first pair of opposing side surfaces, perpendicularly to the median plane and containing the center axis;
   a central plane extending perpendicularly to both the median plane and the longitudinal plane and containing the center axis;
   a first axis extending along an intersection between the median plane and the longitudinal plane and a second axis extending along an intersection between the median plane and the central plane, wherein
   a first cutting edge extends along an intersection between the first side and the circumferential surface on a first side of the longitudinal plane, the first cutting edge, as seen in a view towards the first side, extending along a first corner of the cutting insert, wherein
   a second cutting edge extends along an intersection between the second side and the circumferential surface on the first side of the longitudinal plane, the second cutting edge, as seen in a view towards the second side, extending along a second corner of the cutting insert, wherein
   the first cutting edge includes a first main cutting edge, a first corner cutting edge, and a first auxiliary cutting edge, the first auxiliary cutting edge having a first surface-wiping secondary cutting edge, wherein the first main cutting edge adjoins the first corner cutting edge at a first end of the first main cutting edge, and the first corner cutting edge adjoins the first surface-wiping secondary cutting edge, wherein
   the second cutting edge includes a second main cutting edge, a second corner cutting edge, and a second auxiliary cutting edge, the second auxiliary cutting edge having a second surface-wiping secondary cutting edge, wherein the second main cutting edge adjoins the second corner cutting edge at a first end of the second main cutting edge, and the second corner cutting edge adjoins the second surface-wiping secondary cutting edge, wherein
   as seen in a view along the first axis towards a first side surface of the second pair of opposing side surfaces, a first axial relief face adjacent to the first auxiliary cutting edge and a first axial abutment face form part of a first surface grouping on the first side of the longitudinal plane, wherein
   the first surface grouping forms part of the circumferential surface, wherein as seen in a view along the first axis towards a second side surface of the second pair of opposing side surfaces, a second axial relief face adjacent to the second auxiliary cutting edge and a second axial abutment face form part of a second surface grouping on the first side of the longitudinal plane (LP), wherein the second surface grouping forms part of the circumferential surface, wherein
   a first side surface of the first pair of opposing side surfaces includes a first radial relief face arranged adjacent to the first main cutting edge, wherein as seen in a view along the center axis toward the first side of the cutting insert at least part of the first radial relief face extends outside of the first main cutting edge at least along a part of the main cutting edge, wherein
   a second side surface of the first pair of opposing side surfaces includes a first radial abutment face and a second radial abutment face, wherein the first radial abutment face is arranged between the second side and the second radial abutment face, wherein the second radial abutment face is arranged between the first side and the first radial abutment face, wherein as seen in a plane parallel with the longitudinal plane the first axial relief face extends from the first surface-wiping cutting secondary edge at a first obtuse inner angle (X) to the median plane, wherein
   the cutting insert has 180° rotational symmetry with respect to rotation about the second axis, wherein
   as seen in a plane parallel with the longitudinal plane the second axial relief face extends from the second surface-wiping cutting secondary edge at a second obtuse inner angle to the median plane, wherein
   the first axial abutment face forms a substantially flat surface, wherein
   the first axial abutment face extends perpendicularly to the median plane, wherein
   the second axial abutment face forms a substantially flat surface, wherein
   the second axial abutment face extends perpendicularly to the median plane, and wherein
   the first radial abutment face forms an obtuse third inner angle to the median plane, and wherein the second radial abutment face forms an obtuse fourth inner angle to the median plane.

2. The cutting insert according to claim 1, wherein the obtuse third inner angle is in a range of 91-120 degrees, and wherein the obtuse fourth inner angle is within a range of 91-120 degrees.

3. The cutting insert according to claim 1, wherein the first radial abutment face is arranged on both sides of the median plane, and wherein the second radial abutment face is arranged on both sides of the median plane.

4. The cutting insert according to claim 1, wherein the first radial abutment face extends on a first side of the median plane towards the second side, and wherein the second radial abutment face extends on a second side of the median plane towards the first side.

5. The cutting insert according to claim 1, wherein the first axial abutment face forms a substantially flat surface extending from the median plane towards the second side, and wherein the second axial abutment face forms a substantially flat surface extending from the median plane towards the first side.

6. The cutting insert according to claim 1, wherein the first axial abutment face forms a substantially flat surface extending from the median plane to the second side, and wherein the second axial abutment face forms a substantially flat surface extending from the median plane to the first side.

7. The cutting insert according to claim 1, wherein as seen in the view along the first axis at least a part of the first axial abutment face is arranged between the second side and at least a part of the first surface-wiping secondary cutting edge or at least a major part of the first surface-wiping secondary cutting edge, and wherein at least a part of the second axial abutment face is arranged between the first side and at least a part of the second surface-wiping secondary cutting edge or at least a major part of the second surface-wiping secondary cutting edge.

8. The cutting insert according to claim 1, wherein as seen in a view along the centre axis on the first side of the longitudinal plane, for part of the cutting insert which is between the median plane and the second side, the first axial abutment face forms a surface of the first surface grouping which is the most distant surface of the cutting insert from the center axis.

9. The cutting insert according to claim 1, wherein seen in the view along the centre axis, the first axial abutment face forms a fifth inner angle with the longitudinal plane within a range of 75-89 degrees.

10. The cutting insert according to claim 1, wherein the insert has 180° rotational symmetry with respect to rotation about the second axis and wherein a third cutting edge extends along an intersection between the second side and the circumferential surface on a second side of the longitudinal plane, the third cutting edge, as seen in a view towards the second side, extending along a third corner of the cutting insert, wherein the third cutting edge includes a third main cutting edge, a third corner cutting edge, and a third surface-wiping secondary cutting edge, wherein the third main cutting edge adjoins the third corner cutting edge, and the third corner cutting edge adjoins the third surface-wiping secondary cutting edge, wherein the second side surface of the first pair of opposing side surfaces includes a third radial relief face arranged adjacent to the third main cutting edge, wherein seen in a view along the centre axis toward the second side of the cutting insert, at least part of the third radial relief face extends outside of the third main cutting edge at least along a part of the third main cutting edge, wherein the first radial abutment face extends between the third radial relief face and the second radial abutment face.

11. The cutting insert according to claim 10, wherein the first side surface of the first pair of opposing side surfaces includes a second radial relief face arranged adjacent to the second main cutting edge, wherein when seen in a view along the centre axis and towards the second side of the cutting insert, at least part of the second radial relief face extends outside of the second main cutting edge at least along a part of the second main cutting edge, wherein the first side surface of the first pair of opposing side surfaces comprises a third radial abutment face and a fourth radial abutment face, wherein the third radial abutment face extends between the first radial relief face and the fourth radial abutment face, and wherein the fourth radial abutment face extends between the second radial relief face and the third radial abutment face.

12. The cutting insert according to claim 10, wherein as seen in the direction along the first axis towards the first side surface of the second pair of opposing side surfaces, a third axial relief face adjacent to the third auxiliary cutting edge and a third axial abutment face form part of a third surface grouping on the second side of the longitudinal plane, wherein the first surface grouping and the third surface grouping meet in a partitioning line, wherein the partitioning line extends in the longitudinal plane, and wherein the partitioning line extends from the first side to the second side.

13. The cutting insert according to claim 12, wherein in the median plane an obtuse seventh inner angle is formed between the first surface grouping and the third surface grouping.

14. The cutting insert according to claim 12, wherein the partitioning line forms a distinct line, and/or wherein the partitioning line extends in a straight line, and/or wherein the partitioning line extends perpendicularly to the median plane.

15. The cutting insert according to claim 12, wherein as seen in the view along the first axis the first axial abutment face and the third axial abutment face together continuously extend along a first side surface of the second pair of opposing side surfaces.

16. The cutting insert according to claim 12, wherein as seen in any section through the partitioning line and in parallel with the median plane, the partitioning line extends immediately adjacent to the first axial abutment face and/or the third axial abutment face.

17. A milling tool configured to be rotated about a rotation axis comprising:
 a tool body, wherein the tool body at a first axial end portion thereof is provided with an insert seat for receiving a cutting insert; and
 a cutting insert according to claim 1 arranged in the insert seat.

18. The milling tool according to claim 17, wherein the insert seat is provided with a tangential support surface, a first radial support surface, and an axial support surface.

19. The milling tool according to claim 18, wherein the first radial support surface extends at a sharp eighth angle to the tangential support surface, when seen in a section through the insert seat and in parallel with the central plane when the cutting insert is mounted in the insert seat, wherein a sum of the sharp eighth angle and the obtuse third inner angle is in a range of 179-181 degrees.

20. The milling tool according to claim 18, wherein the cutting insert and the insert seat are arranged such that a portion of the second side abuts against the tangential support surface, the first radial abutment face abuts against the first radial support surface, and the second axial abutment face abuts against the axial support surface, when the first cutting edge is in operable position.

21. The milling tool according to claim 19, wherein the insert seat is provided with a second radial support surface extending at an obtuse ninth angle to the tangential support surface, when seen in a section through the insert seat and in parallel with the central plane when the cutting insert is mounted in the insert seat, wherein an absolute value of a difference between the obtuse ninth angle and the obtuse fourth inner angle, is $|\mu 2 - W'| \leq 1°$.

22. The milling tool according to claim 20, wherein the cutting insert and the insert seat are furthermore arranged such that the second radial abutment face abuts against the second radial support surface, when the first cutting edge is in an operable position.

* * * * *